(12) United States Patent
Lau et al.

(10) Patent No.: US 10,726,513 B2
(45) Date of Patent: Jul. 28, 2020

(54) INFORMATION BEARING DEVICES AND AUTHENTICATION DEVICES INCLUDING SAME

(71) Applicant: POLLY INDUSTRIES LIMITED, Hong Kong (HK)

(72) Inventors: Tak Wai Lau, Hong Kong (HK); Wing Hong Lam, Hong Kong (HK)

(73) Assignee: POLLY INDUSTRIES LIMITED, Hong Kong (HK)

( * ) Notice: Subject to any disclaimer, the term of this patent is extended or adjusted under 35 U.S.C. 154(b) by 0 days.

(21) Appl. No.: 16/262,978

(22) Filed: Jan. 31, 2019

(65) Prior Publication Data

US 2019/0206015 A1   Jul. 4, 2019

Related U.S. Application Data

(63) Continuation-in-part of application No. 15/032,389, filed as application No. PCT/IB2014/065654 on Oct. 28, 2014, now abandoned.

(30) Foreign Application Priority Data

Oct. 28, 2013   (HK) .................................. 13112108.9

(51) Int. Cl.
*G06K 19/06*       (2006.01)
*G06T 1/00*        (2006.01)
(Continued)

(52) U.S. Cl.
CPC .......... *G06T 1/0021* (2013.01); *G06F 21/602* (2013.01); *G06K 19/06037* (2013.01); (Continued)

(58) Field of Classification Search
CPC .......... G06T 1/0021; G06T 2201/0051; G06T 1/005; G06T 2201/0083; G06T 2201/0065;
(Continued)

(56) References Cited

U.S. PATENT DOCUMENTS

| | | | |
|---|---|---|---|
| 6,879,703 B2 * | 4/2005 | Lin | G06T 1/0042 380/201 |
| 7,079,689 B2 * | 7/2006 | Fukuda | H04N 19/51 375/240.03 |

(Continued)

OTHER PUBLICATIONS

Communication pursuant to Article 94(3) EPC for EP14858153.1 dated Nov. 22, 2019.

*Primary Examiner* — Seung H Lee

(57) ABSTRACT

An information bearing device comprising a data bearing pattern, the data bearing pattern comprising M×N pattern defining elements which are arranged to define a set of characteristic spatial distribution properties ($\hat{1}_{u,v}^{M,N}(x,y)$), wherein the set of data comprises a plurality of discrete data and each said discrete data ($u_i, v_i$) has an associated data bearing pattern which is characteristic of said discrete data, and the set of characteristic spatial distribution properties is due to the associated data bearing patterns of said plurality of discrete data, wherein said discrete data and the associated data bearing pattern of said discrete data is related by a characteristic relation function ($\beta_{k_1,k_2}^{u_i,v_i}(x,y)$), the characteristic relation function defining spatial distribution properties of said associated data bearing pattern according to said discrete data ($u_i, v_i$) and a characteristic parameter (k) that is independent of said discrete data.

18 Claims, 11 Drawing Sheets

$\hat{I}_{u,v}^{M,N}(x,y)$ for $D_n$, where $D_n = (D_1(u_1,v_1), D_2(u_2,v_2), D_3(u_3,v_3))$ & $k = 10$

(51) Int. Cl.
*G06F 21/60* (2013.01)
*H04N 1/32* (2006.01)

(52) U.S. Cl.
CPC . *H04N 1/32203* (2013.01); *G06T 2201/0051* (2013.01); *H04N 2201/3233* (2013.01)

(58) Field of Classification Search
CPC ........ H04N 1/32203; H04N 2201/3233; G06F 21/602; G06F 21/44; G06K 19/06037
See application file for complete search history.

(56) References Cited

U.S. PATENT DOCUMENTS

| | | | | |
|---|---|---|---|---|
| 7,684,625 | B2* | 3/2010 | Hyoki | ................... G06T 3/0006 358/1.2 |
| 9,633,195 | B2* | 4/2017 | Lau | ....................... H04W 12/06 |
| 2002/0179717 | A1 | 12/2002 | Cummings et al. | |
| 2008/0008395 | A1* | 1/2008 | Liu | ..................... H04N 19/176 382/244 |

* cited by examiner

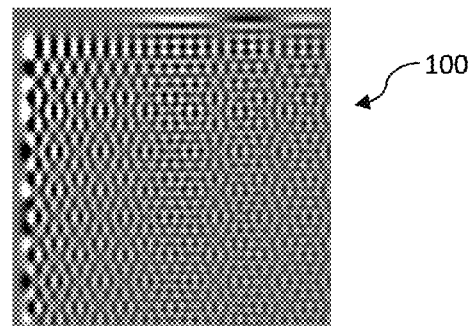
$\hat{I}_{u,v}^{M,N}(x,y)$ for $D_n$, where $D_n = (D_1(u_1,v_1), D_2(u_2,v_2), D_3(u_3,v_3))$ & $k = 10$
Fig. 1
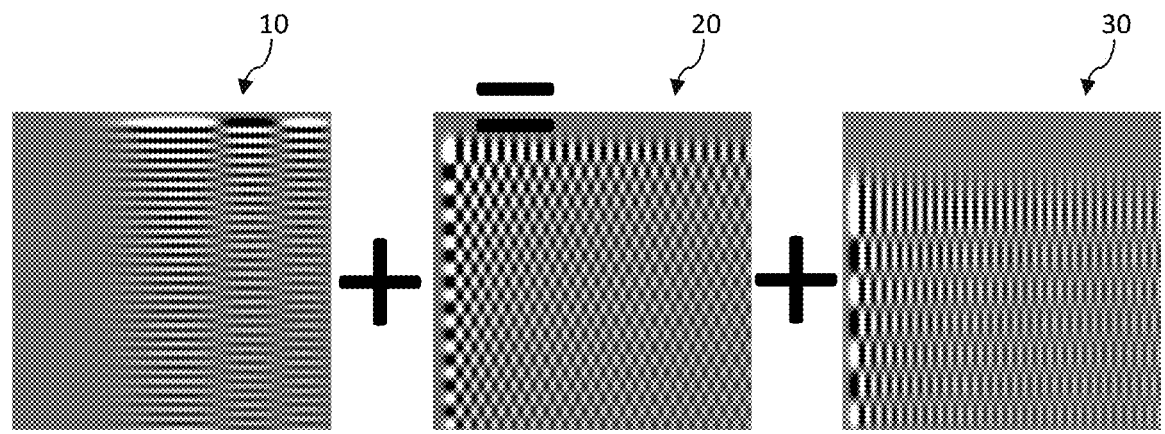
| $\hat{I}_{u=2,v=64}^{M,N}(x,y), k = 10$ | $\hat{I}_{u=46,v=20}^{M,N}(x,y), k = 10$ | $\hat{I}_{u=60,v=6}^{M,N}(x,y), k = 10$ |
| --- | --- | --- |
| $D_1 = (u_1, v_1) = (2, 64)$ | $D_2 = (u_2, v_2) = (46, 20)$ | $D_3 = (u_3, v_3) = (60, 6)$ |
| Fig. 1A | Fig. 1B | Fig. 1C |

$\hat{I}^{M,N}_{u=20,v=20}(x,y), k = 10$ $D_4 = (u_4, v_4) = (20, 20)$ $\hat{I}^{M,N}_{u=20,v=20}(x,y), k = 50$ $D_4 = (u_4, v_4) = (20, 20)$ $\hat{I}^{M,N}_{u,v}(x,y)$ for $D_n$ & $k = 10$, where $D_n =$
$\bigl(D_1(u_1, v_1), D_2(u_2, v2_1), D_3(u_3, v_3),$
$D_4(u_4, v_4)\bigr)$ $\hat{I}^{M,N}_{u,v}(x,y)$ for $D_n$ & $k = 50$, where $D_n =$
$\bigl(D_1(u_1, v_1), D_2(u_2, v2_1), D_3(u_3, v_3),$
$D_4(u_4, v_4)\bigr)$ $\hat{I}_{u,v}^{M,N}(x,y)\ for\ \boldsymbol{D_n}\ \&\ k_1 = 100\ \&\ k_2 = 200, where\ \boldsymbol{D_n} = \big(D_1(u_1, v_1)\big)$

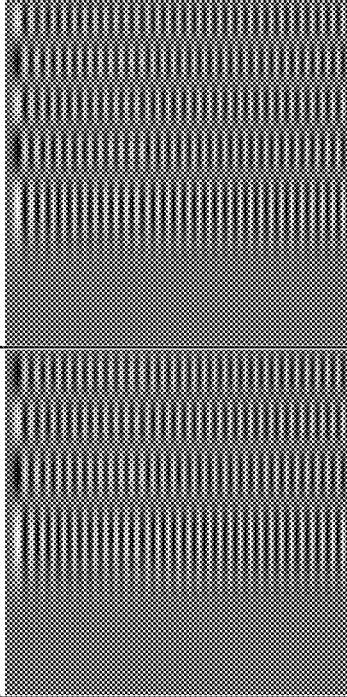
Fig. 8A (u,v)=(1,64) Blank Region length: 75
Fig. 8B (u,v)=(2,64) Length of Blank Region: 58
Fig. 8C (u,v)=(3,64) Length of Blank Region: 48
Fig. 8D (u,v)=(4,64) Length of Blank Region: 41
Fig. 8E (u,v)=(5,64) Length of Blank Region: 36
Fig. 8F (u,v)=(6,64) Length of Blank Region: 31
Fig. 8G (u,v)=(7,64) Length of Blank Region: 28
Fig. 8H (u,v)=(8,64) Length of Blank Region: 25
Fig. 8I (u,v)=(9,64) Length of Blank Region: 23
Fig. 8J (u,v)=(10,64) Length of Blank Region: 21

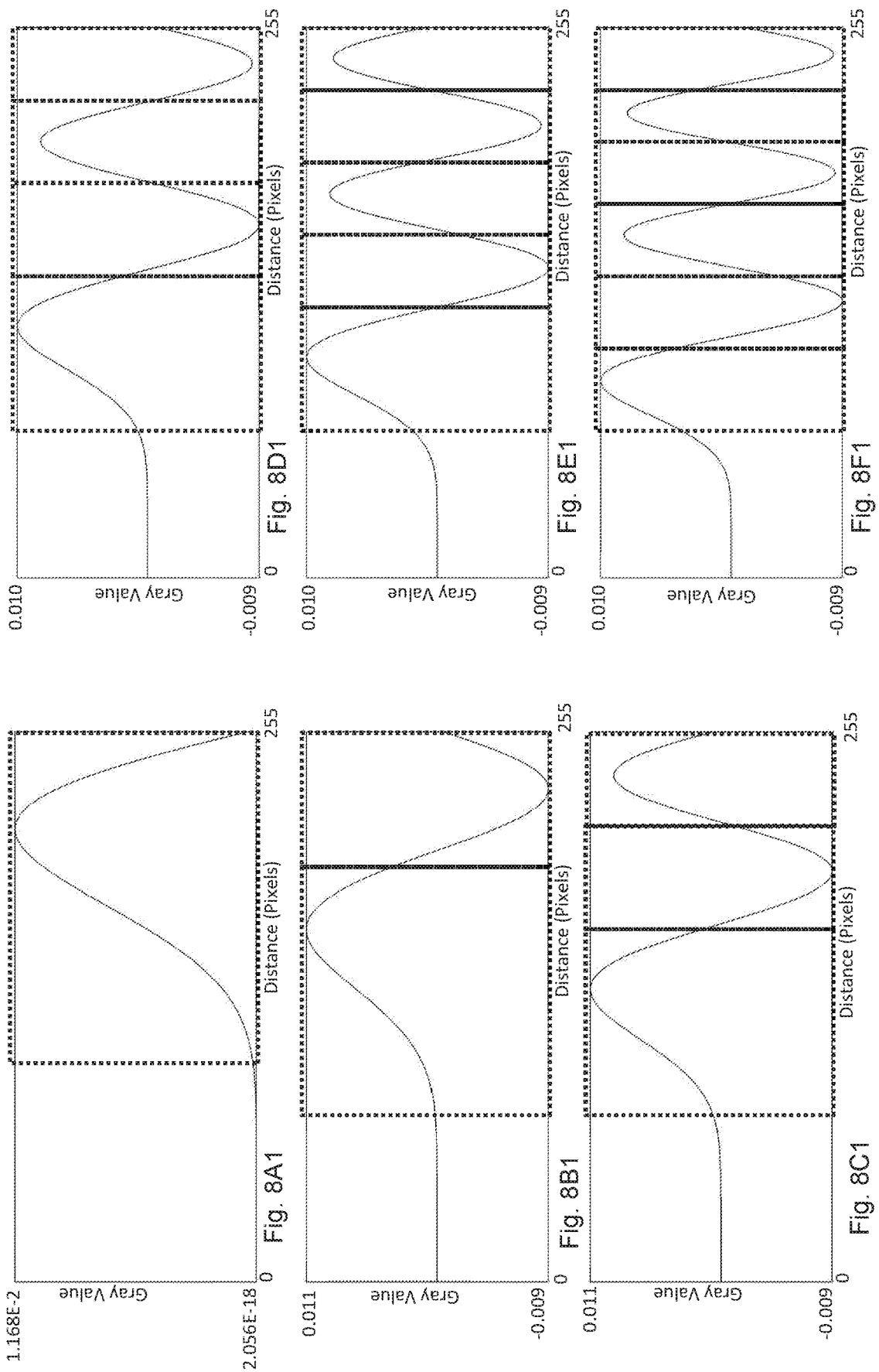

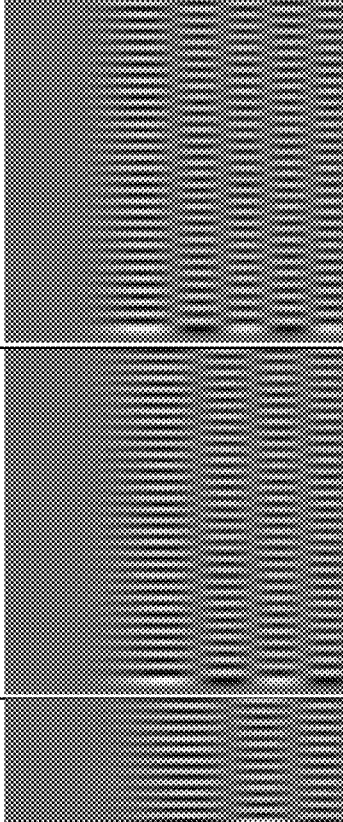
Fig. 9A (u,v)=(60,1) Length of Blank Region: 75
Fig. 9B (u,v)=(60,2) Length of Blank Region: 58
Fig. 9C (u,v)=(60,3) Length of Blank Region: 48
Fig. 9D (u,v)=(60,4) Length of Blank Region: 41
Fig. 9E (u,v)=(60,5) Length of Blank Region: 36
Fig. 9F (u,v)=(60,6) Length of Blank Region: 31
Fig. 9G (u,v)=(60,7) Length of Blank Region: 28
Fig. 9H (u,v)=(60,8) Length of Blank Region: 25
Fig. 9I (u,v)=(60,9) Length of Blank Region: 23
Fig. 9J (u,v)=(60,10) Length of Blank Region: 21

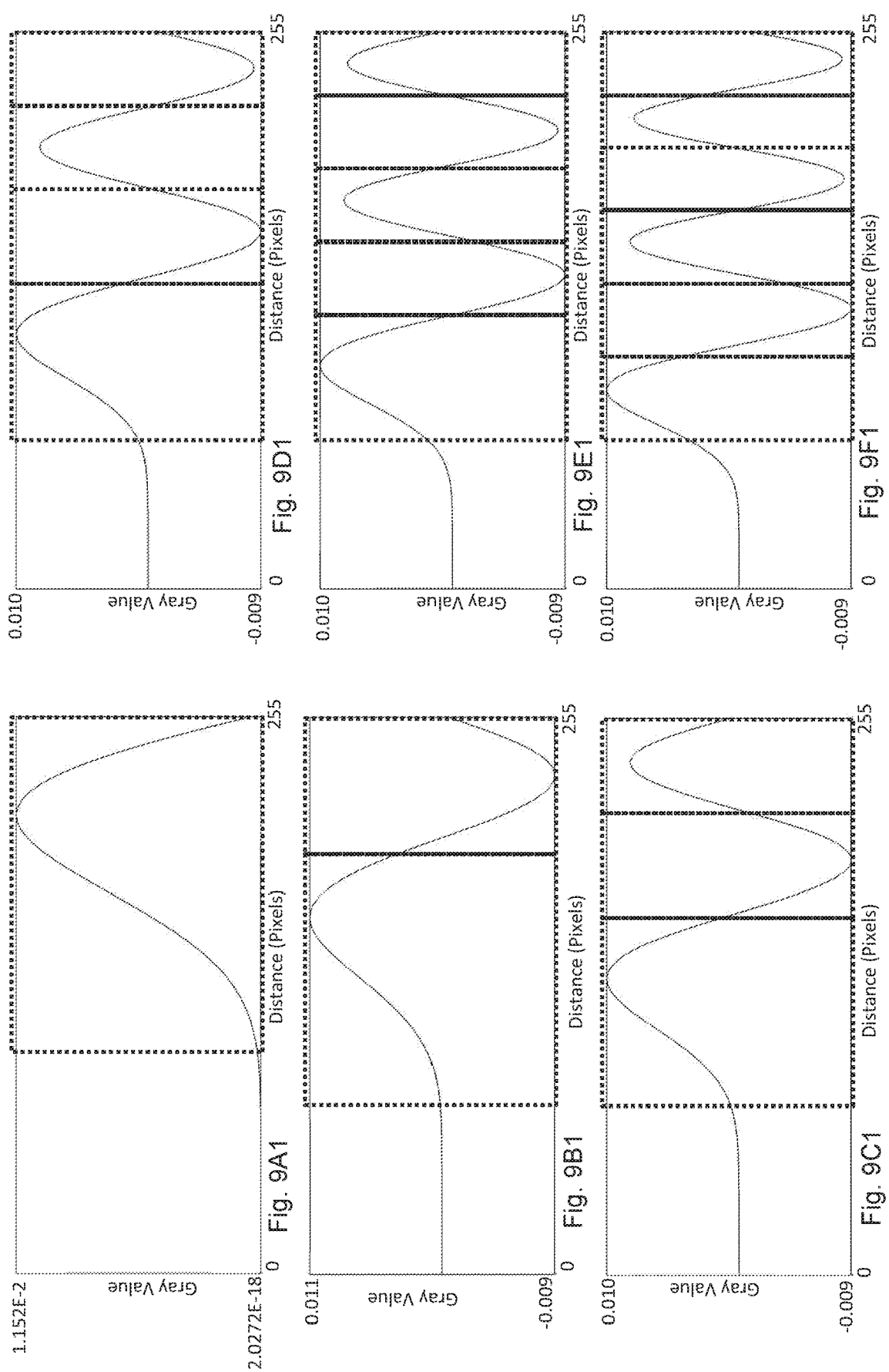

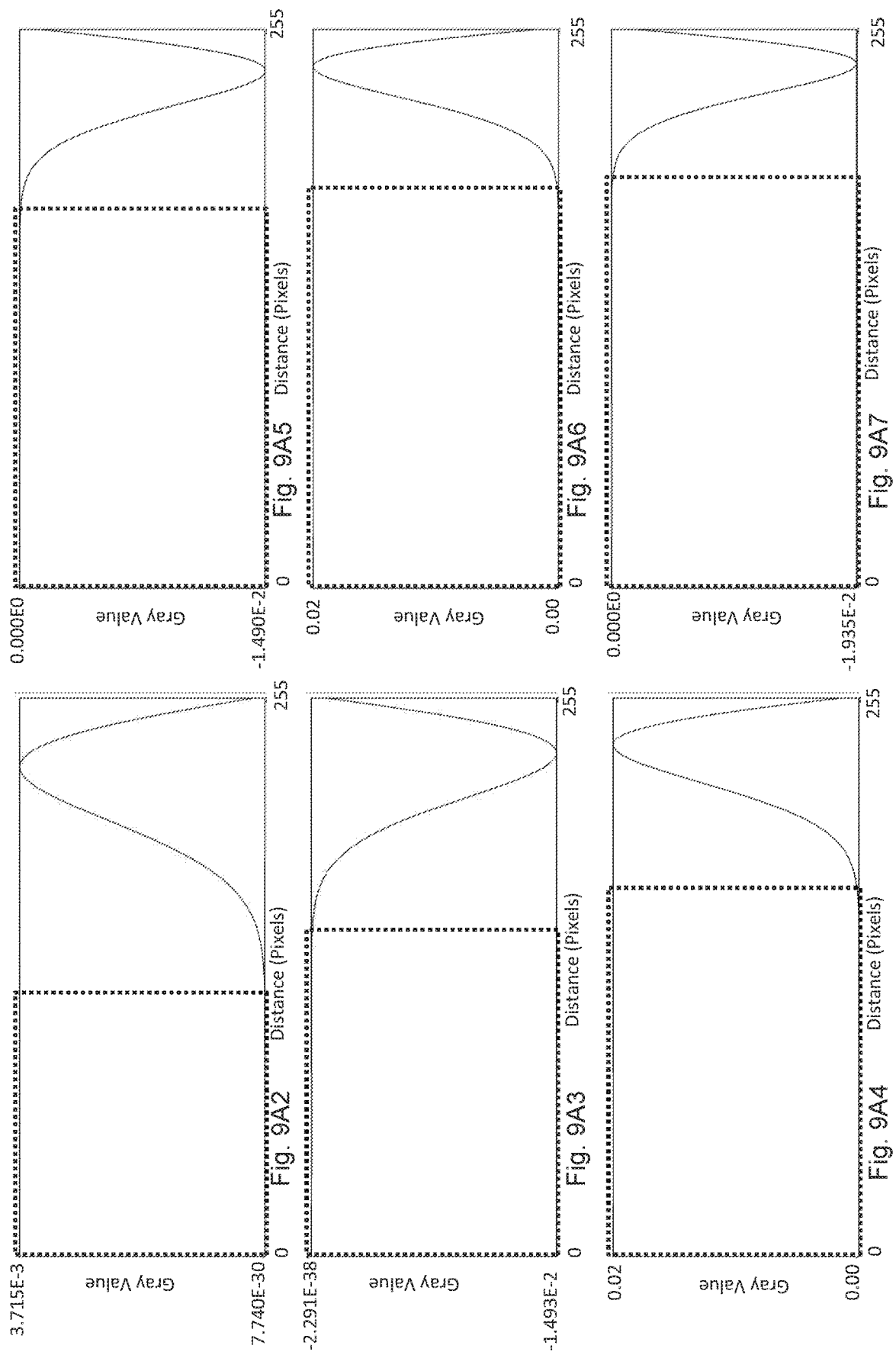

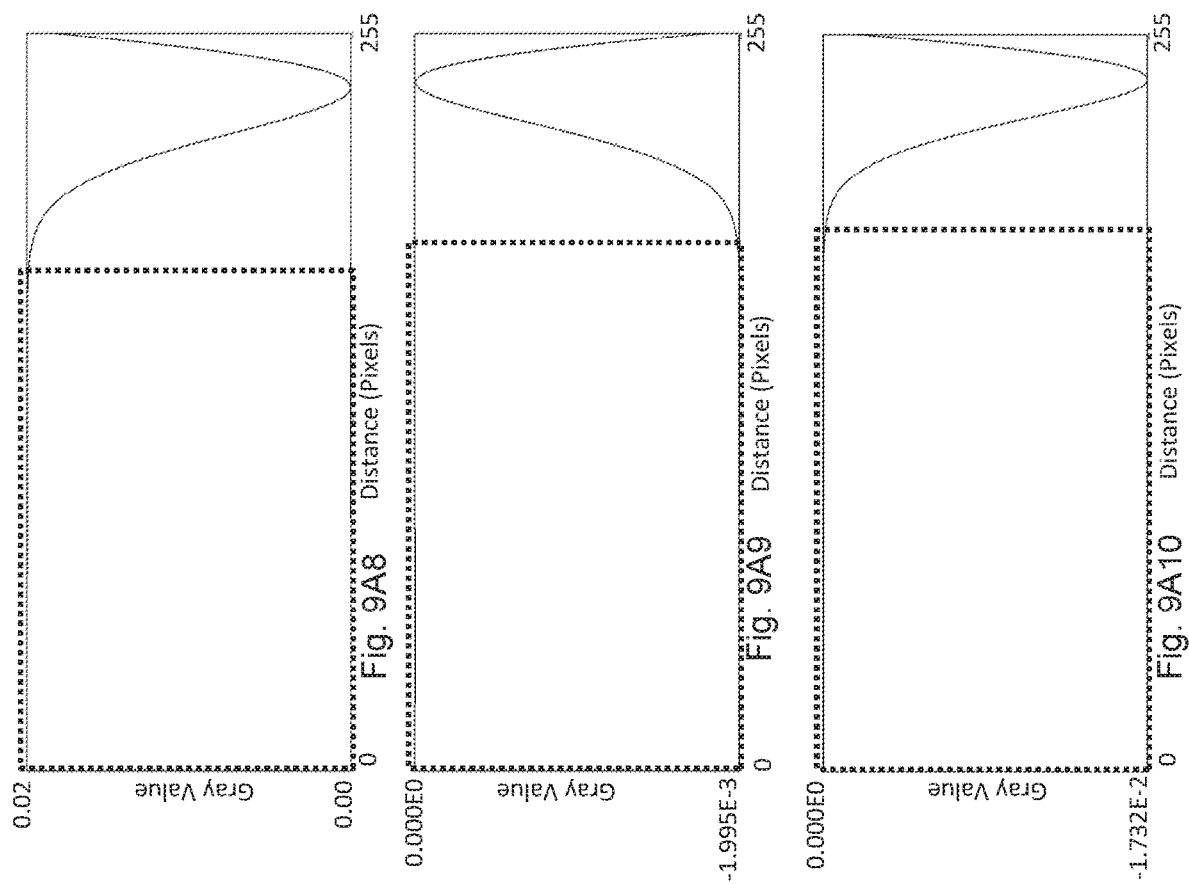

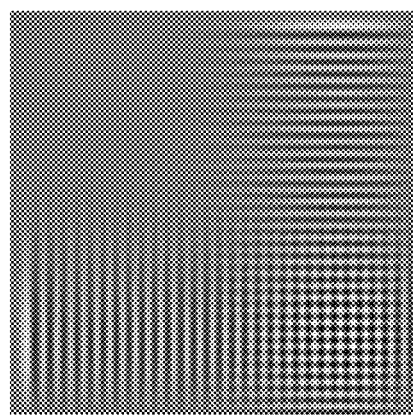
Fig. 10A
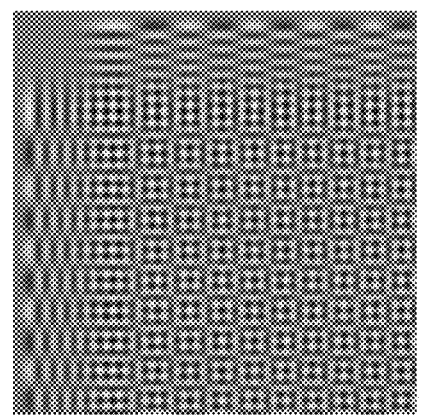
Fig. 10B
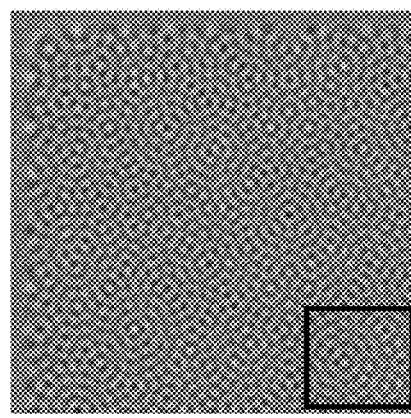
Fig. 11A
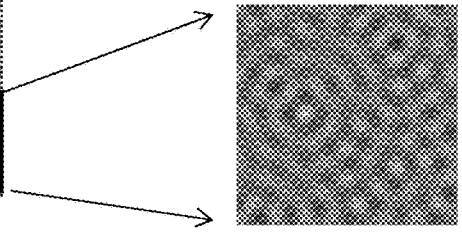
Fig. 11A1
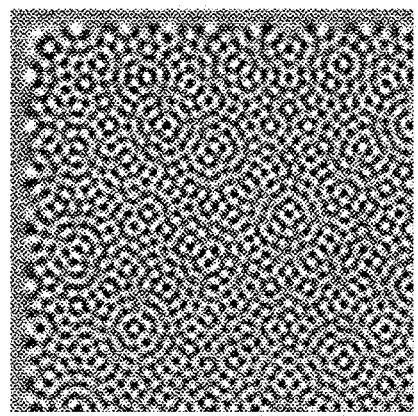
Fig. 11B

Figure 2A:
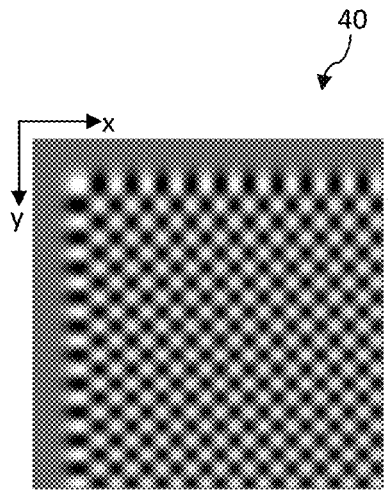
Figure 2B:
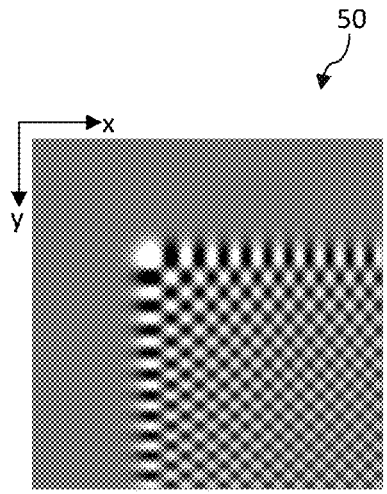
Figure 2:
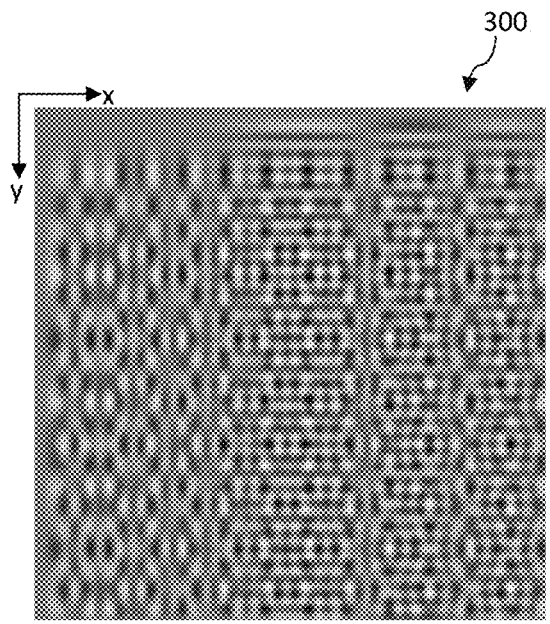

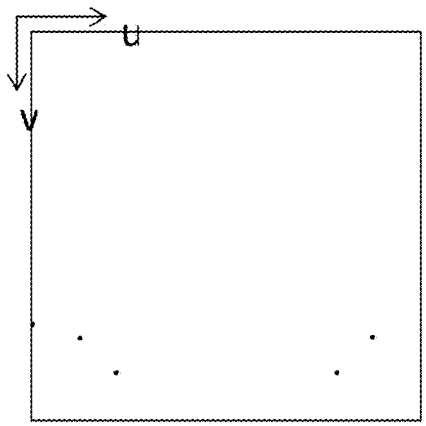
Fig. 11C1
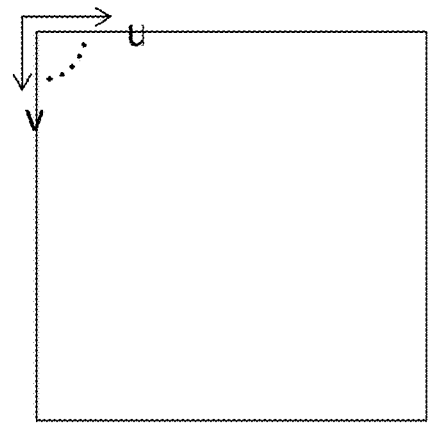
Fig. 11C2
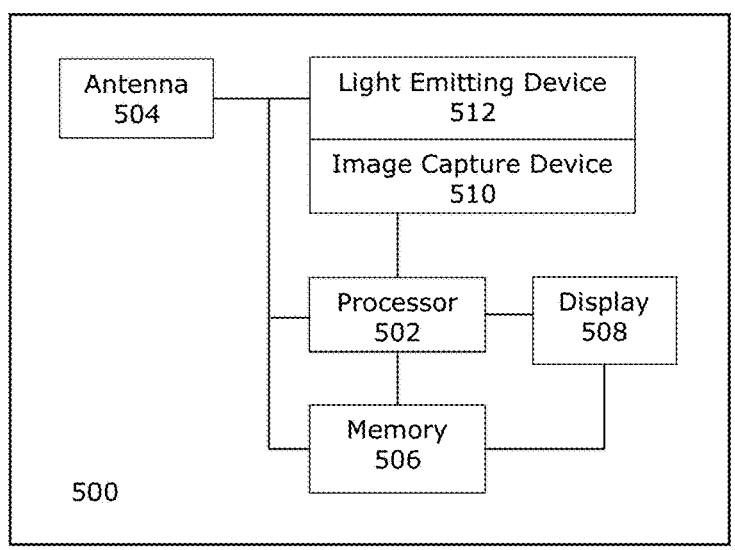
Fig. 12A
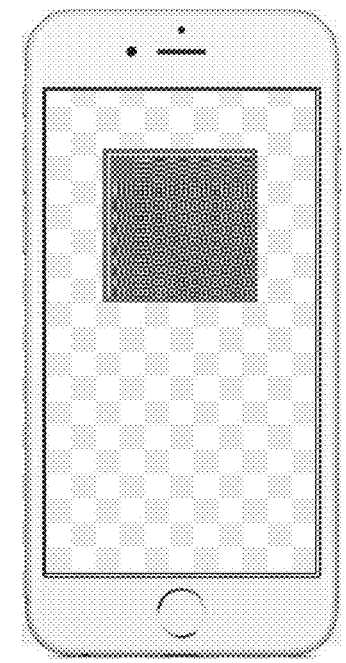
Fig. 12B

US 10,726,513 B2

INFORMATION BEARING DEVICES AND AUTHENTICATION DEVICES INCLUDING SAME

This application is a continuation-in-part application of United States patent application number U.S. Ser. No. 15/032,389, which was filed on Apr. 27, 2016 as a US national phase entry of international patent application PCT/IB2014/065654, which was filed on Oct. 28, 2014 and claimed priority from a patent application 13112108.9 of Hong Kong SAR, China, which was filed on Oct. 28, 2013.

The present invention relates to information bearing devices and authentication devices comprising same.

Information bearing device are widely used to carry coded or un-coded embedded messages. Such messages may be used for delivering machine readable information or for performing security purposes such as for combatting counterfeiting. Many known information bearing devices containing embedded security messages are coded or encrypted using conventional schemes and such coding or encryption schemes can be easily reversed once the coding or encryption schemes are known.

For example, information bearing devices carrying data-bearing image patterns which are covertly embedded with security data in the Fourier domain to function as security features are known. However, the embedded Fourier data can be easily retrieved by performing reverse Fourier Transform and embedding security data using straightforward Fourier transformation is no longer attractive to combat counterfeits.

DISCLOSURE

An information bearing device comprising a data-bearing image pattern is disclosed. An authentication device comprising a data-bearing image pattern is also disclosed. The data-bearing image pattern is covertly encoded with a set of discrete data and the discrete data may be used as a set of security features to facilitate verification of authenticity.

The data bearing pattern comprises M×N pattern defining elements which are arranged to define a set of characteristic spatial distribution properties $\hat{I}_{u,v}^{M,N}(x,y)$. The set of data comprises a plurality of discrete data and each said discrete data $(u_i,v_i)$ has an associated data bearing pattern which is characteristic of said discrete data, and the set of characteristic spatial distribution properties is due to the associated data bearing patterns of said plurality of discrete data. Said discrete data and the associated data bearing pattern of said discrete data is related by a characteristic relation function $(\beta_{k_1,k_2}^{u_i,v_i}(x,y))$. The characteristic relation function defining spatial distribution properties of said associated data bearing pattern according to said discrete data $(u_i,v_i)$ and a characteristic parameter (k) that is independent of said discrete data.

In some embodiments, the data bearing pattern comprises M×N pattern defining elements which are arranged to define a set of characteristic spatial distribution properties $\hat{I}_{u,v}^{M,N}(x,y)$ The set of data comprises at least one discrete data $(u_i,v_i)$. Said discrete data has an associated data bearing pattern which is characteristic of said discrete data. Said discrete data and the associated data bearing pattern of said discrete data is related by a characteristic relation function $(\beta_{k_1,k_2}^{u_i,v_i}(x,y))$. The characteristic relation function defines spatial distribution properties of said associated data bearing pattern according to said discrete data $(u_i,v_i)$ and a characteristic parameter (k) that is independent of said discrete data.

In some embodiments, the data bearing pattern comprises pattern defining elements arranged into M rows along a first spatial direction (x) and N columns along a second spatial direction (y). The relation function $(\beta_{k_1,k_2}^{u_i,v_i}(x,y))$ may have a monotonous trend of change of spatial distribution properties in each spatial direction.

In some embodiments, the set of data comprises a plurality of discrete data and the relation functions $(\beta_k^{u,v}(x,y))$ of said plurality of discrete data are linearly independent.

There is disclosed a method of forming an information bearing device, the information bearing device comprising a data bearing pattern having a set of characteristic spatial distribution properties $\hat{I}_{u,v}^{M,N}(x,y)$. The method comprises processing a set of data comprising a plurality of discrete data by a corresponding plurality of relation functions $(\beta_k^{u,v}(x,y))$ to form the data bearing pattern, wherein the relation functions are linearly independent and each relation function $(\beta_{k_1,k_2}^{u_i,v_i}(x,y))$ relates a discrete data $(u_i,v_i)$ to a data bearing pattern having a set of spatial distribution properties characteristic of said discrete data. The spatial distribution characteristics of said data bearing pattern is dependent on a characteristic parameter that is independent of said discrete data.

In some embodiments, the data bearing pattern comprises M×N pattern defining elements and the method comprises including a maximum of M×N relation functions $\beta_k^{u,v}(x,y)$ to define a maximum of M×N data bearing patterns to form said data bearing pattern, wherein each one of said the M×N data bearing patterns has a set of characteristic spatial distribution properties that is specific to said discrete data $(u_i,v_i)$.

An information bearing device comprising a data bearing pattern is displayed. The data bearing pattern comprising M×N pattern defining elements which are arranged to define a set of characteristic spatial distribution properties $(\hat{I}_{u,v}^{M,N}(x,y))$. The set of data comprises at least one discrete data $(u_i,v_i)$, and said discrete data has an associated data bearing pattern which is characteristic of said discrete data, said discrete data and the associated data bearing pattern of said discrete data is related by a characteristic relation function $(\beta_{k_1,k_2}^{u_i,v_i}(x,y))$, the characteristic relation function defining spatial distribution properties of said associated data bearing pattern according to said discrete data $(u_i,v_i)$ and a characteristic parameter (k) that is independent of said discrete data.

In some embodiments, the set of data comprises a plurality of discrete data and each said discrete data $(u_i,v_i)$ has an associated data bearing pattern which is characteristic of said discrete data, and the set of characteristic spatial distribution properties is due to the associated data bearing patterns of said plurality of discrete data.

In some embodiments, the data bearing pattern comprises pattern defining elements arranged into M rows along a first spatial direction (x) and N columns along a second spatial direction (y), and the relation function $(\beta_{k_1,k_2}^{u_i,v_i}(x,y))$ has a monotonous trend of change of spatial distribution properties in each spatial direction.

In some embodiments, the set of data comprises a plurality of discrete data and the relation functions $([\beta_k^{u,v}(x,y)])$ of said plurality of discrete data are linearly independent.

A method of forming an information bearing device is disclosed. The information bearing device comprising a data bearing pattern having a set of characteristic spatial distribution properties $(\hat{I}_{u,v}^{M,N}(x,y))$. The method comprises processing a set of data comprising a plurality of discrete data by a corresponding plurality of relation functions $([\beta_k^{u,v}(x,y)])$ to form the data bearing pattern. The relation functions are linearly independent and each relation function ($\beta_{k_1,k_2}^{u_i,v_i}(x,y)$) relates a discrete data ($u_i,v_i$) to an data bearing pattern having a set of spatial distribution properties characteristic of said discrete data, and spatial distribution characteristics of said data bearing pattern is dependent on a characteristic parameter that is independent of said discrete data.

In some embodiments, the data bearing pattern comprises M×N pattern defining elements and the method comprises including a maximum of M×N relation functions [$\beta_k^{u,v}(x,y)$] to define a maximum of M×N data bearing patterns to form said data bearing pattern. Each one of said the M×N data bearing patterns has a set of characteristic spatial distribution properties that is specific to said discrete data ($u_i,v_i$).

In some embodiments, said relation function $\beta_{k_1,k_2}^{u_i,v_i}(x,y)$, comprises a first elementary relation function $\varepsilon_{k_1}^{u_i}(x)$ and a second elementary relation function $\varepsilon_{k_1}^{v_i}(y)$, and the first elementary relation function $\varepsilon_{k_1}^{u_i}(x)$ is to relate a first component $u_i$ of a discrete data in a first data domain to a set of spatial distribution properties in a first spatial domain (x) according to a first characteristic parameter component $k_1$, and the second elementary relation function $\varepsilon_{k_2}^{v_i}(y)$ is to relate a second component $v_i$ of the discrete data ($u_i,v_i$) in a second data domain orthogonal to the first data domain to a set of spatial distribution properties in a second spatial domain (y) orthogonal to the first spatial domain according to a second characteristic parameter component $k_2$.

In some embodiments, the first characteristic parameter component $k_1$ and the second characteristic parameter component $k_2$ are equal.

In some embodiments, the data bearing pattern comprises pattern defining elements arranged into M rows along a first spatial direction (x) and N columns along a second spatial direction (y). The relation function $\beta_{k_1,k_2}^{u,v}(x,y)$ is expressable as a product of first and second elementary relation functions ($\varepsilon_{k_1}^u(x)\varepsilon_{k_2}^v(y)$), $k_1$, $k_2$ being orders of the elementary relation functions ($\varepsilon_{k_1}^u(x)$ & $\varepsilon_{k_2}^v(y)$).

In some embodiments, $a_1\varepsilon_{k_1}^{u=1}(x)+a_2\varepsilon_{k_1}^{u=2}(x)+ \ldots +a_M\varepsilon_{k_1}^{u=M}(x)=0$ if and only if $a_1=a_2=\ldots=a_M=0$.

In some embodiments, $a_1\varepsilon_{k_2}^{v=1}(y)+a_2\varepsilon_{k_2}^{v=2}(y)+ \ldots +a_N\varepsilon_{k_2}^{v=M}(y)=0$ if and only if $a_1=a_2=\ldots=a_N=0$.

In some embodiments, $$\sum_{u=1}^{M}\varepsilon_{k_1}^u(x)\varepsilon_{k_1}^u(x') = \begin{cases} 1 & \text{if } x=x' \\ 0 & \text{if } x \neq x' \end{cases}$$

In some embodiments, the first elementary relation function is in the $$\varepsilon_{k_1}^u(x) = \frac{2J_{k_1}\left(\frac{\alpha_{k_1,u}\alpha_{k_1,x}}{\alpha_{k_1,M}}\right)}{\alpha_{k_1,M}|J_{k_1+1}(\alpha_{k_1,u})||J_{k_1+1}(\alpha_{k_1,x})|},$$

and the second elementary relation function is in the form of $$\varepsilon_{k_2}^y(y) = \frac{2J_{k_2}\left(\frac{\alpha_{k_2,v}\alpha_{k_2,y}}{\alpha_{k_2,N}}\right)}{\alpha_{k_2,N}|J_{k_2+1}(\alpha_{k_2,v})||J_{k_2+1}(\alpha_{k_2,y})|}.$$

In some embodiments, the relation function $\beta_{k_1,k_2}^{u,v}(x,y)$ is representable by an expression of the form:

$$\frac{4}{\alpha_{k_1,M+1}\alpha_{k_2,N+1}} \frac{J_{k_1}\left(\frac{\alpha_{k_1,u}\alpha_{k_1,x}}{\alpha_{k_1,M+1}}\right)J_{k_2}\left(\frac{\alpha_{k_2,v}\alpha_{k_2,y}}{\alpha_{k_2,N+1}}\right)}{|J_{k_1+1}(\alpha_{k_1,u})||J_{k_1+1}(\alpha_{k_1,x})||J_{k_2+1}(\alpha_{k_2,v})||J_{k_2+1}(\alpha_{k_2,y})|},$$

where $k_1$, $k_2$ are keys to the relation function $\beta_{k_1,k_2}^{u,v}(x,y)$.

In some embodiments, the relation function $\beta_{k_1,k_2}^{u,v}(x,y)$ is representable by an expression of the form:

$$\frac{4}{\alpha_{k_1,M+1}\alpha_{k_2,N+1}} \frac{J_{k_1}\left(\frac{\alpha_{k_1,u}\alpha_{k_1,x}}{\alpha_{k_1,M+1}}\right)J_{k_2}\left(\frac{\alpha_{k_2,v}\alpha_{k_2,y}}{\alpha_{k_2,N+1}}\right)}{|J_{k_1+1}(\alpha_{k_1,u})||J_{k_1+1}(\alpha_{k_1,x})||J_{k_2+1}(\alpha_{k_2,v})||J_{k_2+1}(\alpha_{k_2,y})|},$$

where $k_1$, $k_2$ are keys to the relation function $\beta_{k_1,k_2}^{u,v}(x,y)$.

In some embodiments, $\sum_{u=1}^{M}\sum_{v=1}^{N}a_{u,v}\beta_k^{u,v}(x,y)=0$ if and only if $a_{1,1}=a_{1,2}=\ldots=a_{M,N}=0$.

In some embodiments, $$\sum_{u=1}^{M}\sum_{v=1}^{N}\beta_k^{u,v}(x,y)\beta_k^{u,v}(x',y') = \begin{cases} 1 & \text{if } x=x' \text{ and } y=y' \\ 0 & \text{otherwise} \end{cases} \quad 1.$$

In some embodiments, the set of data $\hat{I}_{x,y}^{M,N}(u,v)$ and the spatial representation $\hat{I}_{u,v}^{M,N}(x,y)$ are related by an expression of the form $\hat{I}_{x,y}^{M,N}(u,v)=\widetilde{R_{k,M}}(u,x)\hat{I}_{u,v}^{M,N}(x,y)\widetilde{R_{k,N}}(y,v)$, where:

$$R_{k,M}(u,x) = \begin{bmatrix} \varepsilon_k(u=1,x=1) & \cdots & \varepsilon_k(u=1,x=M) \\ \vdots & \ddots & \vdots \\ \varepsilon_k(u=M,x=1) & \cdots & \varepsilon_k(u=M,x=M) \end{bmatrix}, \quad 2.$$

and $$R_{k,N}(v,y) = \begin{bmatrix} \varepsilon_k(v=1,y=1) & \cdots & \varepsilon_k(v=1,y=N) \\ \vdots & \ddots & \vdots \\ \varepsilon_k(v=N,y=1) & \cdots & \varepsilon_k(v=N,y=N) \end{bmatrix}.$$

In some embodiments, $$c_1\begin{pmatrix}\varepsilon_k(1,1)\\\vdots\\\varepsilon_k(M,1)\end{pmatrix}+c_2\begin{pmatrix}\varepsilon_k(1,2)\\\vdots\\\varepsilon_k(M,2)\end{pmatrix}+\ldots+c_{M-1}\begin{pmatrix}\varepsilon_k(1,M)\\\vdots\\\varepsilon_k(M,M)\end{pmatrix}=0$$

if and only if $c_1=c_2=\ldots=c_M=0$.

An authentication device comprising an information bearing device is disclosed. The information devices comprises a data bearing pattern, the data bearing pattern comprising M×N pattern defining elements which are arranged to define a set of characteristic spatial distribution properties ($\hat{I}_{u,v}^{M,N}(x,y)$). The set of data comprises at least one discrete data ($u_i,v_i$), and said discrete data has an associated data bearing pattern which is characteristic of said discrete data. Said discrete data and the associated data bearing pattern of said discrete data is related by a characteristic relation function $\beta_{k_1,k_2}^{u_i,v_i}(x,y)$), the characteristic relation function defining spatial distribution properties of said associated data bearing pattern according to said discrete data ($u_i,v_i$) and a characteristic parameter (k) that is independent of said discrete data.

In some embodiments, the relation function comprises a two-dimensional Bessel function of order k.

In some embodiments, an authentication device further includes information relating to said characteristic parameter (k).

FIGURES

Figure 3:
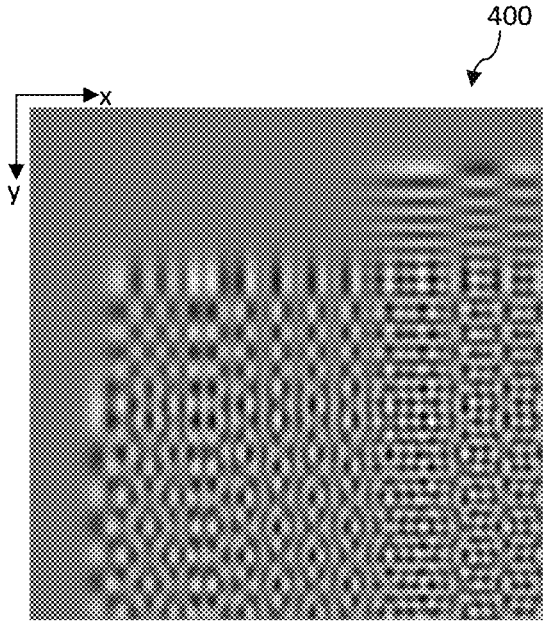
Figure 4:
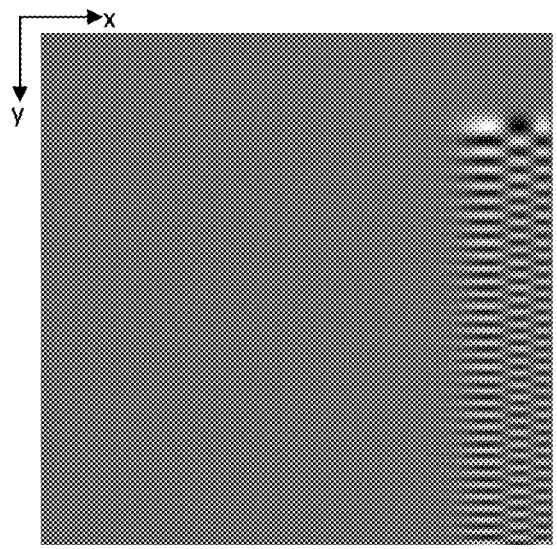
Figure 5:
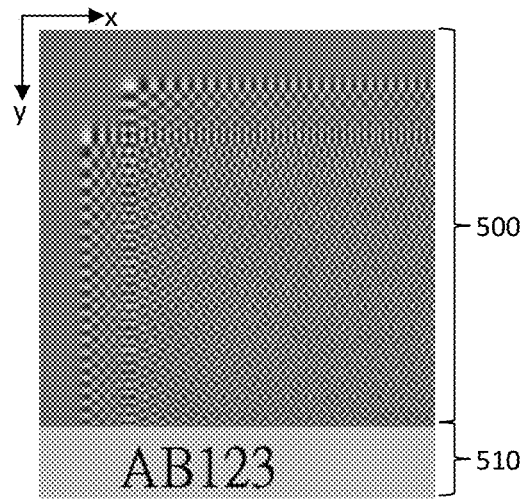
Figure 6:
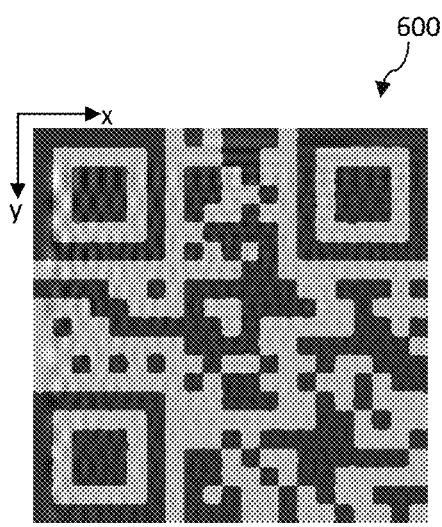
Figure 7:
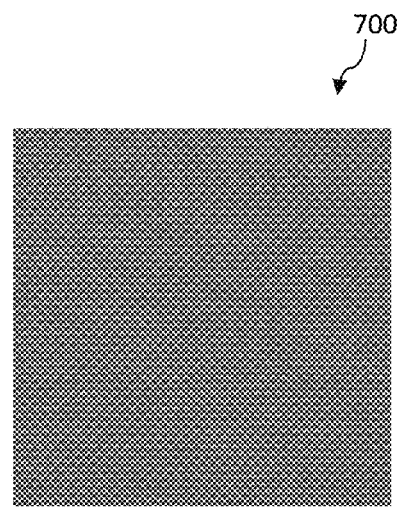

The disclosure will be described by way of example with reference to the accompanying Figures, in which:

FIG. 1 shows an example information bearing device according to the disclosure,

FIG. 1A shows an example information bearing device according to the disclosure, FIG. 1B shows an example information bearing device according to the disclosure, FIG. 1C shows an example information bearing device according to the disclosure, FIG. 2 shows an example information bearing device according to the disclosure, FIG. 2A shows an example information bearing device according to the disclosure, FIG. 2B shows an example information bearing device according to the disclosure, FIG. 3 shows an example information bearing device according to the disclosure, FIG. 4 shows an example information bearing device according to the disclosure, FIG. 5 shows an example information bearing device according to the disclosure, FIG. 6 shows an example information bearing device according to the disclosure, FIG. 7 shows an example information bearing device according to the disclosure, FIGS. 8A to 8J show a plurality of example data-bearing image patterns, FIGS. 8A1 to 8F1 are schematic diagrams showing oscillatory amplitude properties of example data-bearing image patterns on a selected row, FIGS. 9A to 9J show a plurality of example data-bearing image patterns, FIGS. 9A1 to 9F1 are schematic diagrams showing oscillatory amplitude properties of example data-bearing image patterns on a selected column, FIGS. 9A2 to 9A10 are schematic diagrams showing oscillatory amplitude properties of example data-bearing image patterns on a selected column, the data-bearing image patterns having different orders to that of FIG. 9A1, FIG. 10A shows an example data-bearing image pattern formed by aligned superimposition of the data-bearing image patterns of FIGS. 8A and 9A, FIG. 10B shows an example data-bearing image pattern formed by aligned superimposition of the data-bearing image patterns of FIGS. 8J and 9J, FIG. 11A shows an example data-bearing image pattern formed by superimposition of a plurality of Bessel coded data-bearing image patterns and a plurality of Fourier coded data-bearing image patterns, FIG. 11A1 shows an enlarged portion of FIG. 11A, FIG. 11B shows a quantized bi-level version of the example data-bearing image pattern of FIG. 11A, FIGS. 11O1 and 11C2 show, respectively embedded Fourier data points and embedded Bessel data points of the data-bearing image pattern of FIG. 11A on respective data planes, FIG. 12A is a block diagram of an example authentication apparatus, and FIG. 12B shown an example operation stage of the example authentication apparatus of FIG. 12A.

DESCRIPTION

An example information bearing device depicted in FIG. 1 comprises a data bearing pattern 100. The data bearing pattern 100 comprises (N×M) pattern defining elements which are arranged in a display matrix comprising N rows and M columns of pixels or pixel elements, where N=M=256 in this example. Each pixel element can be 8-bit grey-scale coded to have a maximum of 256 grey levels, ranging from 0-255. This data bearing pattern has been encoded with an example set of data $D_n$, where n represents the number of discrete data which is 3 in the present example, and $D_n$ comprises $D_1$, $D_2$, $D_3$. Each of the discrete data $D_1$, $D_2$, $D_3$ comprises a two-dimensional variable $(u_i,v_i)$ having a first component ($u_i$ or 'u'-component) in a first axis, say u-axis and a second component ($v_i$ or 'v'-component) in a second axis, say v-axis, the second axis being orthogonal to the first axis.

Each discrete data may be represented by the mathematical expression below, $$D_i(u,v) = \begin{cases} A_i & u = u_i \text{ and } v = v_i \\ 0 & \text{otherwise} \end{cases},$$

where $A_i$ is an amplitude parameter representing intensity strength of data $D_i$. The values of $A_i$ may be adjusted for each discrete data without loss of generality and are set to 1 as a convenient example. Each discrete data $D_i$ may be denoted by its components $u_i,v_i$ in the data domain and the example discrete data have the following example values:

| $D_i$ | $D_1$ | $D_2$ | $D_3$ |
|---|---|---|---|
| $(u_i, v_i)$ | (2, 64) | (46, 20) | (60, 6) |

The example data bearing pattern 100 can be regarded as a linear combination or a linear superimposition of three data bearing patterns. The three data bearing patterns are respectively due to $D_1$, $D_2$, $D_3$ and the data bearing patterns due to the individual data $D_1$, $D_2$, $D_3$ are depicted respectively in FIGS. 1A, 1B and 10.

The data bearing pattern 10 of FIG. 1A is due to data $D_1$. This data bearing pattern 10 is representable by an expression $\hat{I}_{u_1,v_1}^{M,N}(x,y)$, where $u_1$ and $v_1$ are component values of $D_1$ expressible as a two-dimensional data $(u_1,v_1)$. In this example, $u_1=2$, $v_1=64$ and an expression $\hat{I}_{u_1,v_1}^{M,N}(x,y)$ contains unique spatial distribution properties of the data bearing pattern 10 in the form of grey-level of each pixel element in the matrix of (N×M) pixel elements.

The relationship between the spatial image expression $\hat{I}_{u,v}^{M,N}(x,y)$ and a set of data, D comprising an integer of n discrete 2-dimensional data, namely, $D=((u_1,v_1),(u_2,v2_1), \ldots, (u_n,v_n))$ can be generally expressed as follows:

$$\Sigma_{m=1}^{M}\Sigma_{n=1}^{N}\beta_k^{m,n}(x,y)\{\Sigma_i D_i(m,n)\} \quad (E100)$$

Where $\beta_k^{u,v}(x,y)$ is a relation function relating the discrete data (u,v) to a set of spatial distribution properties as defined by the spatial image expression $\hat{I}_{u,v}^{M,N}(x,y)$ and the spatial distribution properties are further determined by the parameter k.

For the example device of FIG. 1, a modified Bessel function of order k as below is used as an example relation function:—

$$\beta_k^{u,v}(x, y) = \frac{4}{\alpha_{k,M+1}\alpha_{k,N+1}} \frac{J_k\left(\frac{\alpha_{k,u}\alpha_{k,x}}{\alpha_{k,M+1}}\right) J_k\left(\frac{\alpha_{k,v}\alpha_{k,y}}{\alpha_{k,N+1}}\right)}{|J_{k+1}(\alpha_{k,u})||J_{k+1}(\alpha_{k,x})||J_{k+1}(\alpha_{k,v})||J_{k+1}(\alpha_{k,y})|} \quad (E110)$$

where, $$J_k\left(\frac{\alpha_{k,u}\alpha_{k,x}}{\alpha_{k,M+1}}\right)$$

is an elementary relation function for variable x and has a predetermined key k, where x=1 to M, $$J_k\left(\frac{\alpha_{k,v}\alpha_{k,y}}{\alpha_{k,N+1}}\right)$$

is an elementary relation function for variable y having the same key k, where y=1 to N, and, $$J_k(r) = \sum_{i=0}^{\infty} \frac{(-1)^i}{i!\Gamma(i+k+1)}\left(\frac{r}{2}\right)^{2i+k}$$

is a Bessel function of the first kind, $\alpha_{k,i}$ being the i-th root of Bessel function of the first kind of order k, and $\Gamma$ is a gamma function.

Where there is a single discrete data $(u_i,v_i)$, the expression $\hat{I}_{u_1v_1}^{M,N}(x,y)$ above will boil down to a single relation function $\beta_k^{u_i,v_i}(x,y)$ having properties distributed in two spatial dimensions, namely, 'x–' dimension and 'y–' dimension. Therefore, for each single discrete data $(u_i,v_i)$, there is a corresponding characteristic function with properties or characteristics of which are spread, scattered or distributed throughout or around the data bearing pattern 100 which comprises N×M image defining elements. As each expression $\beta_k^{u_i,v_i}(x,y)$ is characteristic or definitive of the spatial properties of an data bearing pattern corresponding to a single discrete data $D_i$ having data coordinates $(u_i,v_i)$, $\beta_k^{u_i,v_i}(x,y)$ can be considered as a characteristic two-dimensional relation function relating or co-relating a single discrete data to an image pattern having a set of spatial distribution properties. Spatial distribution properties in the present context includes spatial variation properties between adjacent pixel elements, including separation between adjacent peak and trough coded pixel elements, separation between adjacent peak and peak and/or trough and trough coded pixel elements, trend of changes of pixel coding between adjacent peak and trough coded pixel elements, and other spatial properties. For example, where pixel elements are coded in grey scales, the coding will appear as intensity amplitude distribution. Where pixel elements are coded in colour, the coding will appear as different colours. A combination of colour and grey scale coding may be used without loss in generality.

As there is a characteristic two-dimensional ('2-D') relation function $\beta_k^{u_i,v_i}(x,y)$ corresponding to each single discrete data $(u_i,v_i)$, and each characteristic two-dimensional function $\beta_k^{u_i,v_i}(x,y)$ corresponds to an image pattern, it follows that each single discrete data has a corresponding image pattern. Where the two-dimensional relation functions $\beta_k^{u_i,v_i}(x,y)$ are unique, no two relation functions will be identical, the image patterns are all unique and each image pattern has a specific corresponding correlation to a discrete data will have a unique correspondence with a corresponding data. As there are a total of N×M characteristic two-dimensional relation functions $\beta_k^{u,v}(x,y)$, a maximum of N×M discrete data can be represented by the image pattern corresponding to the expression $\hat{I}_{u,v}^{M,N}(x,y)$.

Where the characteristic two-dimensional relation functions $\beta_k^{u,v}(x,y)$ have linear independence or are linearly independent, each single discrete data has a specific, unique or singular corresponding image pattern. With the relation functions $\beta_k^{u,v}(x,y)$ being linearly independent, the image pattern as represented by the expression $\hat{I}_{u,v}^{M,N}(x,y)$ can represent a maximum of N×M different discrete data.

The set of N×M relation functions comprises the following individual 2-D relation functions which are linearly independent:

$$\{\beta_k^{1,1}(x,y), \beta_k^{1,2}(x,y), \ldots, \beta_k^{1,N}(x,y),$$

$$\beta_k^{2,1}(x,y), \beta_k^{2,2}(x,y), \ldots, \beta_k^{2,N}(x,y),$$

$$\ldots$$

$$\beta_k^{M,1}(x,y), \beta_k^{M,2}(x,y), \ldots, \beta_k^{M,N}(x,y)\}$$

Linearly independence of the 2-D relation functions $\beta_k^{u,v}(x,y)$ means that the 2-D relation functions $\beta_k^{u,v}(x,y)$ satisfy the following relationship:

$\Sigma_{u=1}^M \Sigma_{v=1}^N a_{u,v}\beta_k^{u,v}(x,y)=0$ if and only if
$a_{1,1}=a_{1,2}=\ldots=a_{M,N}=0$ The 2-D relation functions $\beta_k^{u,v}(x,y)$ can be expressed as a product of two (one dimensional) 1-D elementary relation functions $\varepsilon_k^u(x)$ and $\varepsilon_k^v(y)$ such that $\beta_k^{u,v}(x,y)=\varepsilon_k^u(x)\varepsilon_k^v(y)$, in which for the example of FIG. 1 (altered or modified Bessel function):—

$$\varepsilon_k^u(x) = \frac{2J_k\left(\frac{\alpha_{k,u}\alpha_{k,x}}{\alpha_{k,M}}\right)}{\alpha_{k,M}|J_{k+1}(\alpha_{k,u})||J_{k+1}(\alpha_{k,x})|} \text{ and } \varepsilon_k^v(y) = \frac{2J_k\left(\frac{\alpha_{k,v}\alpha_{k,y}}{\alpha_{k,N}}\right)}{\alpha_{k,N}|J_{k+1}(\alpha_{k,v})||J_{k+1}(\alpha_{k,y})|}$$

The 1-D elementary relation functions $\varepsilon_k^u(x)$ and $\varepsilon_k^v(y)$ are also linearly independent and satisfy the following relationships:

$a_1\varepsilon_k^{u=1}(x)+a_2\varepsilon_k^{u=2}(x)+\ldots+a_M\varepsilon_k^{u=M}(x)=0$ if and only if $a_1=a_2=\ldots=a_M=0$ and $a_1\varepsilon_k^{v=1}(y)+a_2\varepsilon_k^{v=2}(y)+\ldots+a_N\varepsilon_k^{v=N}(y)=0$ if and only if $a_1=a_2=\ldots=a_N=0$.

The relationship between the image pattern $\hat{I}_{u,v}^{M,N}$ and data, D can be expressed in matrix form as follows:

$$\hat{I}_{u,v}^{M,N} = \widetilde{R_{k,N}} I_{x,y}^{M,N} \widetilde{R_{k,M}}, \quad (E120)$$

Where $\hat{I}_{x,y}^{M,N}(u,v)$ is a representation of the data, D, using data domain variables u, v, $$\widetilde{R_{k,M}} = \begin{bmatrix} \varepsilon_k(u=1, x=1) & \cdots & \varepsilon_k(u=1, x=M) \\ \vdots & \ddots & \vdots \\ \varepsilon_k(u=M, x=1) & \cdots & \varepsilon_k(u=M, x=M) \end{bmatrix},$$

and $$\widetilde{R_{k,N}} = \begin{bmatrix} \varepsilon_k(v=1, y=1) & \cdots & \varepsilon_k(v=1, y=N) \\ \vdots & \ddots & \vdots \\ \varepsilon_k(v=N, y=1) & \cdots & \varepsilon_k(v=N, y=N) \end{bmatrix}.$$

The 1-D elementary relation functions $\varepsilon_k^u(x)$ & $\varepsilon_k^v(y)$ in each column of same x value or each column of same y value, are linearly independent.

For computational efficiency, $\widetilde{R_{k,M}}$ when arranged in matrix form comprises the following column vectors of same x values and row vector of same u values:—

$$\left\{ \begin{pmatrix} \varepsilon_k(u=1, x=1) \\ \vdots \\ \varepsilon_k(u=M, x=1) \end{pmatrix}, \begin{pmatrix} \varepsilon_k(u=1, x=2) \\ \vdots \\ \varepsilon_k(u=M, x=2) \end{pmatrix}, \ldots, \begin{pmatrix} \varepsilon_k(u=1, x=M) \\ \vdots \\ \varepsilon_k(u=M, x=M) \end{pmatrix} \right\}$$

In the above matrix, the set of column vectors are linear independent, which means:

$$c_1 \begin{pmatrix} \varepsilon_k(1,1) \\ \vdots \\ \varepsilon_k(M,1) \end{pmatrix} + c_2 \begin{pmatrix} \varepsilon_k(1,2) \\ \vdots \\ \varepsilon_k(M,2) \end{pmatrix} + \ldots + c_M \begin{pmatrix} \varepsilon_k(1,M) \\ \vdots \\ \varepsilon_k(M,M) \end{pmatrix} = 0$$

if and only if $c_1 = c_2 = \ldots = C_M = 0$, and $a_1 \varepsilon_k(1,x) + a_2 \varepsilon_k(2,x) + \ldots + a_M \varepsilon_k(M,x) = 0$ if and only if $a_1 = a_2 = \ldots = a_M = 0$.

Likewise, $\widetilde{R_{k,N}}$ when arranged in matrix form comprises the following column vectors of same y values and row vectors of same v values:

$$\left\{ \begin{pmatrix} \varepsilon_k(v=1, y=1) \\ \vdots \\ \varepsilon_k(v=N, y=1) \end{pmatrix}, \begin{pmatrix} \varepsilon_k(v=1, y=2) \\ \vdots \\ \varepsilon_k(v=N, y=2) \end{pmatrix}, \ldots, \begin{pmatrix} \varepsilon_k(v=1, y=N) \\ \vdots \\ \varepsilon_k(v=N, y=N) \end{pmatrix} \right\}$$

The column vectors of $\widetilde{R_{k,N}}$ are also linearly independent.

Linear independence of the column vectors in the matrix expressions above means that every spatial image $\hat{I}_{u,v}^{M,N}$ having the above relationship would correspond to a unique data set D, and the corresponding unique data set in representation $I_{x,y}^{M,N}$ can be recovered by an inverse transform, for example, by reversing the relationship of E120 above as below:

$$I_{x,y}^{M,N} = \widetilde{R_{k,N}}^{-1} \hat{I}_{u,v}^{M,N} \widetilde{R_{k,M}}^{-1} \qquad \text{E140}$$

For example, where a plurality of discrete data is embedded in an image pattern $\hat{I}_{u,v}^{M,N}(x,y)$, the plurality of discrete data can be recovered by performing the following inverse transformation:

$$\sum_i D_i(u,v) = \frac{4}{\alpha_{k,M+1} \alpha_{k,N+1}}$$

$$\sum_{x=1}^{M} \sum_{y=1}^{N} \frac{J_k\left(\frac{\alpha_{k,u} \alpha_{k,x}}{\alpha_{k,M+1}}\right) J_k\left(\frac{\alpha_{k,v} \alpha_{k,y}}{\alpha_{k,N+1}}\right)}{|J_{k+1}(\alpha_{k,u})||J_{k+1}(\alpha_{k,x})||J_{k+1}(\alpha_{k,v})||J_{k+1}(\alpha_{k,y})|} \{\hat{I}_{u,v}^{M,N}(x,y)\}$$

To further enhance computational efficiency, the relation functions are mutually orthogonal, in which case the 2-D relation functions $\beta_k^{u,v}(x,y)$ has the following characteristics:

$$\sum_{u=1}^{M} \sum_{v=1}^{N} \beta_k^{u,v}(x,y) \beta_k^{u,v}(x', y') = \begin{cases} 1 & \text{if } x=x' \text{ and } y=y' \\ 0 & \text{otherwise} \end{cases}$$

In addition, the 1-D elementary relation functions $\varepsilon_k^u(x)$ & $\varepsilon_k^v(y)$ will have the following orthogonal characteristics:

$$\sum_{u=1}^{M} \varepsilon_k(u,x) \varepsilon_k(u,x') = \begin{cases} 1 & \text{if } x=x' \\ 0 & \text{if } x \neq x' \end{cases}$$

Where the relation functions are orthogonal, total intensity in the forward and inverse transformations $\hat{I}_{u,v}^{M,N}(x,y)$ and $I_{x,y}^{M,N}(u,v)$ is conserved.

In some embodiments, the 1-D (i.e., 1-dimensional) elementary relation functions $\varepsilon_k^u(x)$ and $\varepsilon_k^v(y)$ may have different key parameters, k. For example, $\varepsilon_k^u(x)$ has $k=k_1$ and $\varepsilon_k^v(y)$ has $k=k_2$, in which case the set of discrete data may be recovered from an inverse transformation having the following expression:

$$\sum_i D_i(u,v) =$$

$$\frac{4}{\alpha_{k1,M+1} \alpha_{k2,N+1}} \sum_{x=1}^{M} \sum_{y=1}^{N} \frac{J_{k1}\left(\frac{\alpha_{k1,u} \alpha_{k1,x}}{\alpha_{k1,M+1}}\right) J_{k2}\left(\frac{\alpha_{k2,v} \alpha_{k2,y}}{\alpha_{k2,N+1}}\right)}{|J_{k1+1}(\alpha_{k1,u})||J_{k1+1}(\alpha_{k1,x})|} \{\hat{I}_{u,v}^{M,N}(x,y)\}$$

$$|J_{k2+1}(\alpha_{k2,v})||J_{k2+1}(\alpha_{k1,y})|$$

In an example, the set of data D comprises a single discrete data $D_1$ only, with $D_1 = (u_1, v_1) = (2, 64)$, the representation $\hat{I}_{u,v}^{M,N}(x,y)$ will become $\hat{I}_{u1,v1}^{M,N}(x,y) = \hat{I}_{2,64}^{M,N}(x,y)$ and the expression:

$$\sum_{m=1}^{M} \sum_{n=1}^{N} \beta_k^{m,n}(x,y) \left\{ \sum_i D_i(m,n) \right\}$$

will become:

$$\hat{I}_{u=2,v=64}^{M,N}(x,y) = \sum_{m=1}^{M} \sum_{n=1}^{N} \beta_k^{m,n}(x,y) \{D_1(m,n)\}$$

$$= \beta_k^{2,64}(x,y)$$

$$= G_k^{2,64}(x,y) J_k\left(\frac{\alpha_{k,2} \alpha_{k,x}}{\alpha_{k,257}}\right) J_k\left(\frac{\alpha_{k,64} \alpha_{k,y}}{\alpha_{k,257}}\right)$$

where $$G_k^{2,64}(x,y) = \frac{4}{\alpha_{k,257}\alpha_{k,257}|J_{k+1}(\alpha_{k,2})||J_{k+1}(\alpha_{k,x})|}\,,$$
$$|J_{k+1}(\alpha_{k,64})||J_{k+1}(\alpha_{k,y})|$$

is a normalizing factor, and where $$J_k(r) = \sum_{i=0}^{\infty} \frac{(-1)^i}{i!\Gamma(i+k+1)}\left(\frac{r}{2}\right)^{2i+k}$$

and $\alpha_{k,j}$ is a root of Bessel function and k is order of the Bessel function.

Therefore, the data bearing pattern 10 of FIG. 1A as represented by the expression $\hat{I}_{u=2,v=64}^{M,N}(x,y)$ has a unique corresponding representation in the form of:

$$G_k^{2,64}(x,y)J_k\left(\frac{\alpha_{k,2}\alpha_{k,x}}{\alpha_{k,257}}\right)J_k\left(\frac{\alpha_{k,64}\alpha_{k,y}}{\alpha_{k,257}}\right) \text{ for } k=10.$$

Similarly, where the set of data D comprises a single discrete data $D_2$ and $D_2=(u_2,v_2)=(46,20)$, the representation $\hat{I}_{u,v}^{M,N}(x,y)$ of the data bearing pattern 20 of FIG. 1B will become $\hat{I}_{u2,v2}^{M,N}(x,y)=\hat{I}_{46,20}^{M,N}(x,y)$ and the unique corresponding representation will be in the form of $$G_k^{46,20}(x,y)J_k\left(\frac{\alpha_{k,46}\alpha_{k,x}}{\alpha_{k,257}}\right)J_k\left(\frac{\alpha_{k,20}\alpha_{k,y}}{\alpha_{k,257}}\right) \text{ for } k=10.$$

Likewise, where the set of data D comprises a single discrete data $D_3$ and $D_3=(u_3,v_3)=(60,6)$, the representation $\hat{I}_{u,v}^{M,N}(x,y)$ of the data bearing pattern 30 of FIG. 10 will become $\hat{I}_{u3,v3}^{M,N}(x,y)=\hat{I}_{60,6}^{M,N}(x,y)$ and the unique corresponding representation will be in the form of $$G_k^{60,6}(x,y)J_k\left(\frac{\alpha_{k,60}\alpha_{k,x}}{\alpha_{k,257}}\right)J_k\left(\frac{\alpha_{k,6}\alpha_{k,y}}{\alpha_{k,257}}\right) \text{ for } k=10.$$

Where the set of data D comprises 3 discrete data, namely, $D=(D_1, D_2, D_3)$, the expression $\hat{I}_{u,v}^{M,N}(x,y)$ of the data bearing pattern 100 of FIG. 1 is due to the sum of the three corresponding expressions of the individual data, namely, $D_1$, $D_2$, and $D_3$.

In another example, the set of data D further comprises another discrete data $D_4$, where $D_4=(u_4,v_4)=(20,20)$. The data bearing pattern 300 having the expression $\hat{I}_{u,v}^{M,N}(x,y)$ as depicted in FIG. 2 is due to the sum of the four corresponding expressions of the individual data, namely, $D_1$, $D_2$, $D_3$, and $D_4$ without loss of generality.

Where the set of data D comprises a single discrete data $D_4$, the spatial representation of the data bearing pattern $\hat{I}_{u,v}^{M,N}(x,y)$ will become $\hat{I}_{u4,v4}^{M,N}(x,y)=\hat{I}_{20,20}^{M,N}(x,y)$ and the unique corresponding representation will be in the form of $$G_k^{20,20}(x,y)J_k\left(\frac{\alpha_{k,20}\alpha_{k,x}}{\alpha_{k,257}}\right)J_k\left(\frac{\alpha_{k,20}\alpha_{k,y}}{\alpha_{k,257}}\right).$$

When the order k is 10, the data bearing pattern will be as depicted in FIG. 2A. As depicted in FIG. 2B, when the order k is changed to 50, the data bearing pattern will have its appearance changed even though the data remains the same as $D_4(20,20)$.

Where k is changed to 50, the data bearing pattern 400 for the set of discrete data $D_1$, $D_2$, $D_3$, and $D_4$ is as depicted in FIG. 3, showing a different set of spatial distribution properties.

In the example information bearing device as depicted in FIG. 4, the example data bearing pattern is obtained by processing data $D_1$ with $k_1=100$ and $k_2=200$.

Where an image pattern is formed in an image area definable by an example plurality of N×M pixel elements, for examples arranged into N rows and M columns, the image pattern can have a total of N×M×L number of possible variations in pattern contents, where L is the possible variation in value of each pixel element. For an image pattern defined by N×M pixel elements where each pixel element can have a possible value of one of the maximum variations of 256 grey scale levels, namely, from 0 to 255, L=256.

From the equation $\hat{I}_{u,v}^{M,N}(x,y)=\Sigma_{u=1}^{M}\Sigma_{v=1}^{N}\beta_k^{u,v}(x,y)\{\Sigma_i D_i(u,v)\}$ above, it will be noted that the function $\beta_k^{u,v}(x,y)$ comprises a plurality of relation functions $\beta_k^{u_i,v_i}(x,y)$, where $1\le u_i\le M$ and $1\le v_i\le N$. Each of the relation functions $\beta_k^{u_i,v_i}(x,y)$ has the effect of spreading or scattering a discrete data $(u_i,v_i)$ into an image pattern of (N×M) pixel elements the spatial distribution characteristic of which is characteristic of the discrete data $(u_i,v_i)$ and the specific relation function $\beta_k^{u_i,v_i}(x,y)$. As there are a total of N×M relation functions $\beta_k^{u_i,v_i}(x,y)$, a maximum of N×M discrete data can be represented by an image pattern of (N×M) pixel elements where each of the relation functions $\beta_k^{u_i,v_i}(x,y)$ is unique. Even if the relation functions are known, recovery or reverse identification of the actual data still require a correct key k.

A captured image of an example information bearing device formed on a printed tag is depicted in FIG. 5. The example information bearing device comprises an example data bearing pattern 500 and a set of key information bearing device 510. The data bearing pattern 500 was previously processed by the transformation process of E120 to convert a set of discrete data into the data bearing pattern 500 which carries a set of spatial distribution properties that is characteristic of the set of discrete data. The key information bearing device 510 comprises the set of images corresponding to 'AB123' which is printed underneath the data bearing pattern 500. To retrieve data embedded in the data bearing pattern 500, the message 'AB123' is recovered from the image, for example, by optical character recognition, and the related parameter (k) will be retrieved, for example, from databases relating the message to the parameter (k) as depicted in the table below.

TABLE 1

| Message | 111 | 110 | 101 | AB123 | ... |
| Parameter (k) | 100 | 51 | 312 | 100 | ... |

The data bearing pattern 500 is resized into M×N pixels and reverse transformation process E140 is performed on the resized image to recover the set of data.

A captured image of an example information bearing device formed on a printed tag is depicted in FIG. 6. The example information bearing device comprises an example data bearing pattern 600 and a set of key information bearing device. The data bearing pattern 600 was previously processed by the transformation process of E120 to convert a set of discrete data into the data bearing pattern 600 which carries a set of spatial distribution properties that is characteristic of the set of discrete data. The key information bearing device comprises a set of key data '111' which was also encoded on the information bearing device, albeit using a different coding scheme. In this example, the key data '111' was encoded in a format known as 'QR'™ code.

To retrieve data embedded in the data bearing pattern 600, the message '111' is recovered from the image, and the related parameter (k) will be retrieved, for example, from databases relating the message to the parameter (k) as depicted in Table 1 above.

Likewise, the data bearing pattern 600 is resized into M×N pixels and reverse transformation process E140 is performed on the resized image to recover the set of data.

A captured image of an example information bearing device formed on a printed tag is depicted in FIG. 7. The example information bearing device comprises an example data bearing pattern 700 and a set of key information bearing device. The data bearing pattern 700 was previously processed by the transformation process of E120 to convert a set of discrete data into the data bearing pattern 700 which carries a set of spatial distribution properties that is characteristic of the set of discrete data. The key information bearing device comprises a set of key parameters '111' which was also encoded on the information bearing device, albeit using a Fourier coding scheme.

To recover the key parameter, inverse Fourier transform is performed and the key parameter thus obtained is utilised to recover the set of discrete data after resizing the information bearing pattern 700 into M×N pixels and then to perform the reverse transformation process E140.

Example data-bearing image patterns which are characteristic of a plurality of discrete data $D_i$ are shown in FIGS. 8A to 8J. Each of the data-bearing image pattern is an image pattern which is characteristic of an embedded discrete data $D_i$. The discrete data comprises a first data portion which is a first data component $u_i$ and a second data portion which is a second data component $v_i$. The first data component is a first data coordinate on a first data axis u defining a first axial direction in a data plane and the second data component is a second data coordinate on a second data axis u in the data plane defining a second axial direction which is orthogonal to the first axial direction. The first data axis (or first axis in short) and the second data axis (or the second axis in short) which is orthogonal to the first data axis cooperate to define a two-dimensional data plane. The example data coordinates $u_i, v_i$ are coordinates in the in Cartesian coordinate system, and have their polar coordinate counterparts $r_i, \theta_i$ without loss of generality. Where the transformation function is a Bessel function, the data plane is conveniently referred to as a Bessel plane or Bessel data plane.

Each of the example data-bearing image patterns is defined by an example plurality of N×M data-defining image elements, and each one of N and M is a natural number or a positive integer. Each data-defining image element is an image-defining element which may be a pixel, which is a minimum unit, or an aggregate of pixels without loss of generality. Where a data-defining image element is a single pixel, the spatial properties of the data-bearing image pattern is characterised by an example of N×M pixels. In example embodiments such as those herein, a data-bearing image pattern has N=M=256 or 512 pixels and the pattern is defined within a square boundary, for example, a square boundary having a side of say 1-1.5 or 2.0 cm length. An example pixel density of between 256 and 512 pixels per centimetre (cm) provides a good balance between high pixel content and density and ease of recovery processing.

The two-dimensional discrete data $D_i$, also referred to as $D_i(u_i, v_i)$, is covertly embedded in a data-bearing image pattern by an example transformation process depicted in E160 and E162 below.

$$\hat{I}^{M,N}_{u,v}(x,y) = \sum_{m=1}^{M}\sum_{n=1}^{N} \beta^{m,n}_k(x,y)\{D_i(m,n)\} = \beta^{u,v}_k(x,y), \quad \text{E160}$$

$$\beta^{u,v}_k(x,y) = \frac{4}{\alpha_{k,M+1}\alpha_{k,N+1}} \frac{J_k\left(\frac{\alpha_{k,u}\alpha_{k,x}}{\alpha_{k,M+1}}\right)J_k\left(\frac{\alpha_{k,v}\alpha_{k,y}}{\alpha_{k,N+1}}\right)}{|J_{k+1}(\alpha_{k,u})||J_{k+1}(\alpha_{k,x})|}, \quad \text{E162}$$
$$|J_{k+1}(\alpha_{k,v})||J_{k+1}(\alpha_{k,y})|$$

In equations E160 and E162, $\hat{I}(x,y)$ stands for the signal characteristic of a data-defining image element at a specific image plane coordinates (x,y),k is the order of the transformation function, u means $u_i$ and v meaning $v_i$. The image plane is defined by a first image plane axis (x-axis) and a second image plane axis (y-axis) which is orthogonal to the x-axis. Where the image-defining elements are distributed in a matrix formed of rows and columns, the x-axis is typically used to define the direction of extension of a row and the a y-axis is typically used to define the direction of extension of a column.

The signal characteristic of a data-defining image element at a specific image plane coordinates (x,y) may be a magnitude representing brightness levels, grey levels, color, or other amplitude variables without loss of generality. The signal characteristics of the entire data-bearing image pattern are defined when the signal characteristics of all the data-defining image element s with x=1 . . . M, y=1 . . . N are known or defined.

The transformation process or the transformation function comprises a first elementary function and a second elementary function which are multiplied together to modulate the data coordinates (u,v).

The first elementary function $$J_k\left(\frac{\alpha_{k,u}\alpha_{k,x}}{\alpha_{k,M+1}}\right)$$

correlates the first data coordinate $u_i$ and k with the first image coordinates x. More specifically, the first elementary function integrates the first data coordinate $u_i$ and k into the first image coordinates x.

The second elementary function $$J_k\left(\frac{\alpha_{k,v}\alpha_{k,y}}{\alpha_{k,N+1}}\right)$$

correlates the second data coordinate $v_i$ and k with the second image coordinates y. More specifically, the second elementary function integrates the second data coordinate $v_i$ and k into the second image coordinates y.

Each of the elementary functions is an oscillatory function, with the phase and amplitude characteristics along the respective axis dependent on respective data coordinates and the order k as variables.

A transformation comprising multiplication of the two oscillatory elementary functions results in an image pattern having oscillatory characteristics due to the component elementary functions.

The signal characteristics of a data-bearing image pattern which embeds a data $D_i(u_i, v_i)$ are dependent on the data coordinates $u_i, v_i$, the order k, as well as the transformation function.

Unlike conventional data coding schemes such as Fourier transformations, the embedded data coordinates $u_i, v_i$ of a data $D_i$ cannot be recovered without exhaustive computation unless the embedded order k of the transformation function is known.

Therefore, the signal characteristics of a data-bearing image pattern according to the disclosure are determined by three independent variables, namely, $u_i, v_i, k$. The three independent variables form a three-dimensional data which can be used to form a security feature, for example, to form a security feature to facilitate authentication verification to combat counterfeiting.

Each of the example elementary functions is a Bessel function of the first kind and of order k. The example elementary function is a decaying oscillatory function such that the maximum amplitude of the characteristic signal decays on extending from a reference, for example, from the origin (x=0, y=0).

Because of the enhanced security afforded by the covert data transformation, the data-bearing image pattern and the embedded data can be used as security features. For example, the discrete data may represent an access code or a security code, which is recoverable by a computer-based machine running stored instructions to perform inverse transformation to recover the data coordinates to form the code.

To facilitate authentication applications, one discrete data or a plurality of discrete data may be embedded in an image pattern by a transformation process which requires three independent variables, for example, $u_i, v_i, k$, to determine the signal characteristics of the image pattern. The data coordinates of the discrete data and the order of the transformation function are pre-set or pre-determined. The data-bearing pattern may be affixed permanently to a carrying medium for medium-term or long-term use. The carrying medium be an article or in the form of a label attached or for attachment to an article, for example, a branded article or an article having a unique identity or identification. The label may be made of plastics, paper, leather or other materials that permit formation of a permanent image of sufficiently high data resolution or data density.

The image pattern may be visible to the naked human eyes or may be hidden and not readable by naked human eyes but is readable when exposed to a revealing or excitation source such as ultra-violet light. For example, the data-bearing image pattern may be formed as a security feature may be printed The totality of the signal characteristics of the entire data-bearing image pattern are due to an ensemble, or more specifically a matrix ensemble, of the signal characteristics $\hat{I}(x,y)$ at all the spatial variables x,y, where x has discrete spatial coordinate values from 1 to M, and y has discrete spatial coordinate values from 1 to N. The signal characteristic may be signal amplitudes, signal strengths, signal intensities, signal colours, or other signal parameters without loss of generality. It is noted that the signal characteristics of a data-defining image element are determined by the three independent variables u, v and k.

The transformation process is preferably performed by machine, for example, by a computer-based or micro-processor-based solid-state machine executing stored instructions. The transformation function and its reverse or inverse function are preferable discrete or digital transformation functions.

The signal characteristics of the image-defining elements are spatially distributed throughout the image pattern and the spatial distribution properties of the signal characteristics are determined by the three independent variables u, v and k as well as according to the transformation function.

While the embedded data and the associated security features can be recovered, the recovery machine would need to have knowledge on the specific transformation function used and the order of the transformation function before reverse or inverse transformation can be meaningfully and effectively performed.

In some embodiments, information on the transformation function and its order and or its inverse may be set on the data-bearing image pattern or its vicinity. For example, the information may be set in a human readable or a human perceivable form and may be coded according to a coding scheme.

The signal magnitude S at a data point D having a data point location defined by the 2-dimensional data plane coordinates u, v is related to the signal characteristics of the totally of the N×M image-defining elements of the data-bearing image pattern by a mathematical or computational relationship E180.

$$S(u,v) = \frac{4}{\alpha_{k,M+1}\alpha_{k,N+1}} \sum_{x=1}^{M}\sum_{y=1}^{N} \frac{J_k\left(\frac{\alpha_{k,u}\alpha_{k,x}}{\alpha_{k,M+1}}\right)J_k\left(\frac{\alpha_{k,v}\alpha_{k,y}}{\alpha_{k,N+1}}\right)}{|J_{k+1}(\alpha_{k,u})||J_{k+1}(\alpha_{k,x})|} \quad E180$$
$$|J_{k+1}(\alpha_{k,v})||J_{k+1}(\alpha_{k,y})|$$

The computational relationship E180 represents an inverse transformation function comprising a first elementary function and a second elementary function which are inter-modulated by mutual multiplication, in same manner as that of E162.

The inverse transformation function E180 comprises a first elementary function and a second elementary function which are multiplied together to modulate the image plane coordinates (x,y).

The first elementary function $$J_k\left(\frac{\alpha_{k,u}\alpha_{k,x}}{\alpha_{k,M+1}}\right)$$

correlates the signal characteristics of the first image coordinates x and order k with the first data coordinate $u_i$. More specifically, the first elementary function operates to integrate the signal characteristics of the first image coordinates x and order k into the first data coordinate $u_i$.

The second elementary function $$J_k\left(\frac{\alpha_{k,v}\alpha_{k,y}}{\alpha_{k,N+1}}\right)$$

correlates the signal characteristics of the second image coordinates y and order k with the second data coordinate $v_i$. More specifically, the first elementary function integrates the signal characteristics of the second image coordinates y and order k into the second data coordinate $v_i$.

It is noted that the signal magnitude $S_i$ of a data point $D_i$ at data plane coordinates $u_i, v_i$ is dependent on values of the signal characteristics of all the image-defining elements, the transformation function order k, as well as the specific transformation function.

Applying the reverse transformation process, the signal magnitude at the discrete data point $D_i(u_i, v_i)$ can be obtained. Where the image pattern has been embedded with a plurality of discrete data points, the signal magnitudes of the discrete data points can be recovered by the same inverse process of E180 without loss of generality, since for example, the elementary functions and the discrete data are linearly independent.

It will be appreciated the value of signal magnitude at a data point having the predetermined data coordinates is due to the signal characteristics of all the component image-defining elements, although some of the image-defining elements carry a zero or null signal magnitude.

In practical applications, a data-bearing image pattern may have 50×50 image-defining elements or more. The extensive computation required to perform coding and decoding means coding and decoding is too complicated for human processing and must be performed by machine to be meaningful for all practical purposes.

An embedded data $D_i$, and more particularly the data plane coordinates $(u_i, v_i)$ of the embedded data $D_i$ is integrated, scrambled or spread into the data-bearing image pattern. The data-bearing image pattern which is due solely to the embedded security data $D_i$ is not human perceivable nor human readable. In some embodiments, the data-bearing image pattern may be modulated with a human perceivable and/or a human readable device, although the device is not due to the embedded data without loss of generality.

In general, neither the data $D_i$ nor its data value is human perceivable or human readable directly from the data-bearing image pattern, for example, with the aid of a magnifying glass or ultra-violet light. The data value herein means the signal magnitude of the data $D_i$.

Information on the embedded Bessel data $D_i$ can be recovered from a data-bearing image pattern $\hat{I}(x,y)$ by performing inverse transformation on Equation E180.

In example embodiments, the embedded data $D_i$ on an information bearing device is to be recovered by machine-operated computation and the recovered data is to be compared with a set of reference data for verification of authenticity.

In example operations, the data recovery process comprises operating an apparatus to:
align the data-bearing image pattern with an alignment device devised on the apparatus at 1110,
capturing the image after successful alignment at 1120,
processing the signal characteristics of the image-defining elements of the data-bearing image pattern to compute data signal magnitude at a data location $D_i$ having a set of data plane coordinates $(u_i, v_i)$ at 1130, wherein the processing is based on a pre-determined inverse transformation process comprising an inverse transformation function of the disclosure, a pre-selected order as a decoding key parameter k and the data plane coordinates $(u_i, v_i)$;
comparing the computed data signal magnitude with a set of reference criteria at 1140, the set of reference criteria may comprise a reference data signal magnitude or a reference range of data signal magnitudes;
determining whether the computed data signal magnitude matches with prescribed criteria and is acceptable at 1160;
verifying authenticity if outcome of comparison is positive and denying verification of authentication if outcome of comparison is negative at 1170.

In example embodiments such as the present, the inverse transformation process may be based on and the computed data signal magnitude may be computed on the basis of the computational relationship of E180.

Steps 1110 and 1120 is optional, since the data-bearing image pattern may be captured by another apparatus and transferred to the authentication apparatus to perform verification of authenticity.

The reference data signal magnitude may be an expected data signal magnitude calculated on the bases of E160 and E180.

The prescribed criteria may be a threshold signal magnitude strength, for example, an upper threshold limit or a lower threshold limit, and the criteria may include below the upper threshold limit or above the lower threshold limit.

The key herein is the order of the transformation function, which may be on the information bearing device and on or adjacent the data-bearing image pattern in coded form.

The alignment device may be an accessory which is generated on a display and which defines the boundary, borders, or corners of boundary of an image of a predetermined physical dimensions for due processing by the reverse transformation function of E180. For example, the alignment device is designed to capture an image having N×M pixels when the boundary of the data-bearing image patent is aligned squared with the alignment device and in focus.

Where a plurality of discrete data is embedded in a data-bearing image pattern, the steps 1130 to 1160 are applied to the plurality of data, whether in one-go or in different steps without loss of generality.

Where plurality of discrete data is embedded in a data-bearing image pattern, an average of the computed data signal magnitudes may be used to compare with a set of reference criteria obtained on the bases of averaging the corresponding plurality of expected data signal magnitudes.

In example embodiments, the data information recovery process is performed by a smartphone which comprises an image capture device, a microprocessor-based controller, a data storage and a display, such as a high-resolution LCD display.

In the example process of 1110, the exact coordinates of the security data are known to the machine and the machine only processes the data-bearing image pattern to retrieve signal characteristics at the specific coordinates of the discrete data or the plurality of discrete data.

In some embodiments, the locations of the data points are unknown and the steps 1130 and 1140 are modified as follows:
performing inverse transformation on the data-bearing image pattern using a known key k to identify data point coordinates having signal magnitudes matching a threshold magnitude requirement at 1130A,
recording the data point coordinates at 1140A, and
comparing the coordinates with a set of pre-recorded coordinates of pre-set security data point coordinates at 1150A,
determining whether the locations and their coordinates match at 1160A;
verifying authenticity if outcome of comparison is positive and denying verification of authentication if outcome of comparison is negative at 1170.

Steps 1130A, 1150A and 1160A may be replaced by:
computing the data signal magnitude at the data point coordinates at step 1130C, comparing the computed data signal magnitude with expected data signal magnitude obtained using E160 and E180 at 1140C; and determining whether the computed data signal magnitude and the expected data signal magnitude are in agreement or within an acceptable range at 1150C.

The threshold magnitude requirement may be defined with reference to an upper threshold limit, a lower threshold limit, or an acceptable magnitude range. The magnitude requirement may be below the upper threshold limit, above the lower threshold limit or within the acceptable magnitude range.

In some embodiments, steps 1150A onwards are modified as follows:

Determining signal strength (i.e., data signal magnitude) at the identified data points at 1150B, Comparing the signal strengths with a predetermined threshold and determining whether the signal strengths match a threshold requirement at 1160B, and verifying authenticity if outcome of comparison is positive and denying verification of authentication if outcome of comparison is negative at 1170.

Example data-bearing image patterns which are characteristic of a plurality of discrete data $D_i$ are shown in FIGS. 8A to 8J. Each of the data $D_i$ is transformed by the same example transformation function having an example order of k=10 and the corresponding spatial properties of the data-bearing image pattern $\hat{I}(x,y)$ are set out respectively below in Table A.

TABLE A

| $u_i,v_i$ | blank | $\hat{I}(x,y)$ |
|---|---|---|
| 1,64 | 75 | $\dfrac{4}{\alpha_{10,257}\alpha_{10,257}} \dfrac{J_{10}\left(\dfrac{\alpha_{10,1}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,1})||J_{11}(\alpha_{10,x})||J_{11}(\alpha_{10,64})||J_{11}(\alpha_{10,y})|}$ |
| 2,64 | 58 | $\dfrac{4}{\alpha_{10,257}\alpha_{10,257}} \dfrac{J_{10}\left(\dfrac{\alpha_{10,2}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,2})||J_{11}(\alpha_{10,x})||J_{11}(\alpha_{10,64})||J_{11}(\alpha_{10,y})|}$ |
| 3,64 | 48 | $\dfrac{4}{\alpha_{10,257}\alpha_{10,257}} \dfrac{J_{10}\left(\dfrac{\alpha_{10,3}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,3})||J_{11}(\alpha_{10,x})||J_{11}(\alpha_{10,64})||J_{11}(\alpha_{10,y})|}$ |
| 4,64 | 41 | $\dfrac{4}{\alpha_{10,257}\alpha_{10,257}} \dfrac{J_{10}\left(\dfrac{\alpha_{10,4}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,4})||J_{11}(\alpha_{10,x})||J_{11}(\alpha_{10,64})||J_{11}(\alpha_{10,y})|}$ |
| 5,64 | 36 | $\dfrac{4}{\alpha_{10,257}\alpha_{10,257}} \dfrac{J_{10}\left(\dfrac{\alpha_{10,5}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,5})||J_{11}(\alpha_{10,x})||J_{11}(\alpha_{10,64})||J_{11}(\alpha_{10,y})|}$ |
| 6,64 | 31 | $\dfrac{4}{\alpha_{10,257}\alpha_{10,257}} \dfrac{J_{10}\left(\dfrac{\alpha_{10,6}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,6})||J_{11}(\alpha_{10,x})||J_{11}(\alpha_{10,64})||J_{11}(\alpha_{10,y})|}$ |
| 7,64 | 28 | $\dfrac{4}{\alpha_{10,257}\alpha_{10,257}} \dfrac{J_{10}\left(\dfrac{\alpha_{10,7}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,7})||J_{11}(\alpha_{10,x})||J_{11}(\alpha_{10,64})||J_{11}(\alpha_{10,y})|}$ |
| 8,64 | 25 | $\dfrac{4}{\alpha_{10,257}\alpha_{10,257}} \dfrac{J_{10}\left(\dfrac{\alpha_{10,8}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,8})||J_{11}(\alpha_{10,x})||J_{11}(\alpha_{10,64})||J_{11}(\alpha_{10,y})|}$ |
| 9,64 | 23 | $\dfrac{4}{\alpha_{10,257}\alpha_{10,257}} \dfrac{J_{10}\left(\dfrac{\alpha_{10,9}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,9})||J_{11}(\alpha_{10,x})||J_{11}(\alpha_{10,64})||J_{11}(\alpha_{10,y})|}$ |
| 10,64 | 21 | $\dfrac{4}{\alpha_{10,257}\alpha_{10,257}} \dfrac{J_{10}\left(\dfrac{\alpha_{10,10}\alpha_{10,x}}{\alpha_{10,257}}\right)J_{10}\left(\dfrac{\alpha_{10,64}\alpha_{10,y}}{\alpha_{10,257}}\right)}{|J_{11}(\alpha_{10,10})||J_{11}(\alpha_{10,x})||J_{11}(\alpha_{10,64})||J_{11}(\alpha_{10,y})|}$ |

Each of the data $D_i$ may be assigned a binary value, for example, 0 or 1. When a data $D_i$ is present in the data plane at data plane coordinates $u_i,v_i$, the coordinates may be marked as a black dot (on a light or white background) or a white dot ((on a dark or black background) to signify presence or 1. When a data $D_i$ is not present in the data plane at data plane coordinates $u_i,v_i$, the coordinates may have the same appearance as the background to signify non-presence or 0. In some embodiments, the data $D_i$ at the coordinates $u_i,v_i$ may have a non-binary data value, for example, a M-nary value, where M is larger than 2, or an analogue value.

Example data-bearing image patterns which are characteristic of a plurality of discrete data $D_i$ are shown in FIGS. 9A to 9J. Each of the data $D_i$ is transformed by the same example transformation function which has an example order of k=10 and the corresponding spatial properties of the data-bearing pattern $\hat{I}(x,y)$ are set out respectively below in Table B.

TABLE B

| $u_i,v_i$ | blank | $\hat{I}(x,y)$ |
|---|---|---|
| 60,1 | 75 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,1}\alpha_{10,y}}{\alpha_{10,257}}\right)}{|J_{11}(\alpha_{10,60})||J_{11}(\alpha_{10,x})||J_{11}(\alpha_{10,1})||J_{11}(\alpha_{10,y})|}$ |
| 60,2 | 58 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,2}\alpha_{10,y}}{\alpha_{10,257}}\right)}{|J_{11}(\alpha_{10,60})||J_{11}(\alpha_{10,x})||J_{11}(\alpha_{10,2})||J_{11}(\alpha_{10,y})|}$ |
| 60,3 | 48 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,3}\alpha_{10,y}}{\alpha_{10,257}}\right)}{|J_{11}(\alpha_{10,60})||J_{11}(\alpha_{10,x})||J_{11}(\alpha_{10,3})||J_{11}(\alpha_{10,y})|}$ |
| 60,4 | 41 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,4}\alpha_{10,y}}{\alpha_{10,257}}\right)}{|J_{11}(\alpha_{10,60})||J_{11}(\alpha_{10,x})||J_{11}(\alpha_{10,4})||J_{11}(\alpha_{10,y})|}$ |
| 60,5 | 36 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,5}\alpha_{10,y}}{\alpha_{10,257}}\right)}{|J_{11}(\alpha_{10,60})||J_{11}(\alpha_{10,x})||J_{11}(\alpha_{10,5})||J_{11}(\alpha_{10,y})|}$ |
| 60,6 | 31 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,6}\alpha_{10,y}}{\alpha_{10,257}}\right)}{|J_{11}(\alpha_{10,60})||J_{11}(\alpha_{10,x})||J_{11}(\alpha_{10,6})||J_{11}(\alpha_{10,y})|}$ |
| 60,7 | 28 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,7}\alpha_{10,y}}{\alpha_{10,257}}\right)}{|J_{11}(\alpha_{10,60})||J_{11}(\alpha_{10,x})||J_{11}(\alpha_{10,7})||J_{11}(\alpha_{10,y})|}$ |
| 60,8 | 25 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,8}\alpha_{10,y}}{\alpha_{10,257}}\right)}{|J_{11}(\alpha_{10,60})||J_{11}(\alpha_{10,x})||J_{11}(\alpha_{10,8})||J_{11}(\alpha_{10,y})|}$ |

TABLE B-continued

| $u_i, v_i$ | blank | $\hat{I}(x,y)$ |
|---|---|---|
| 60,9 | 23 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,9}\alpha_{10,y}}{\alpha_{10,257}}\right)}{|J_{11}(\alpha_{10,60})||J_{11}(\alpha_{10,x})||J_{11}(\alpha_{10,9})||J_{11}(\alpha_{10,y})|}$ |
| 60,10 | 21 | $\dfrac{4}{\alpha_{10,257}\alpha_{10,257}} \dfrac{J_{10}\left(\dfrac{\alpha_{10,60}\alpha_{10,x}}{\alpha_{10,257}}\right)J_{10}\left(\dfrac{\alpha_{10,10}\alpha_{10,y}}{\alpha_{10,257}}\right)}{|J_{11}(\alpha_{10,60})||J_{11}(\alpha_{10,x})||J_{11}(\alpha_{10,10})||J_{11}(\alpha_{10,y})|}$ |

The data $D_i$ of Table A have same v values, while those of Table B have same u values.

The data $D_i$ of Table A and Table B have origins at u=1 and v=1, while those of FIG. 7 and before have origins at u=0 and v=0. Therefore, the data of FIG. 7 and earlier are to be offset with 1,1 to be compatible with those of Tables A and B and figures of FIGS. 8A to 8J and thereafter.

The oscillatory properties of the image are visible from the data-bearing image patterns shown in FIGS. 8A to 8J and 9A to 9J. For example, the image pattern of FIG. 8A comprises a blank region on one side and an oscillatory region on another side. The oscillatory region has its image signal (for example, brightness or darkness) values oscillating between bright and dark on moving downwards and there is one oscillation on moving from left to right. On the other hand, the image pattern of FIG. 8D has a plurality of oscillation cycles on progressing downwards and on progressing towards the right side, although the number or frequency of oscillation in the downward direction is higher than that on traversing sideways. On the other hand, the image patterns of FIGS. 9A-9J have a higher number and frequency of oscillation on the sidewise direction than the downward direction.

Exemplary signal amplitude properties of FIGS. 8A to 8F and of FIGS. 9A to 9F are depicted schematically in FIGS. 8A1 to 8F1 and FIGS. 9A1 to 9F1, respectively. Each of the example data-bearing image pattern has an example size of 1 cm×1 cm and defined by a matrix of image-defining elements. The image-defining elements are distributed into N rows and M columns, where N=M=256. Oscillatory signal characteristics of the image-defining elements of the are data-bearing image patterns are visible. In FIGS. 8A1 to 8F1 signal characteristic of the image-defining elements in the form of signal amplitude on the $128^{th}$ row (in the x-direction) is depicted. The $128^{th}$ row is about midway of the number of rows and is selected in convenience.

Referring to FIG. 8A, the signal amplitudes of the image-defining elements in the x-direction comprise an initial portion which starts from x=0 and an oscillatory portion which follows or is after the initial portion. The signal amplitude of the image-defining elements in the initial portion is approximately constant, and is at about zero amplitude. The signal amplitude of the image-defining elements in the oscillatory portion, which is adjacent the steady-state-portion and further away from the origin (0,0), collectively forms a half-oscillation cycle. The value of u=1 defines an image pattern having a half oscillation cycle per-unit of image dimension, which in this example is 1 cm.

For the image pattern of FIGS. 8B to 8F, the u values progressively increment from u=2 to u=6. The number of half oscillation cycles of the signal amplitudes of the image-defining elements in the x-direction progressively changes from 2 to 6 respectively. The steady state portion has an amplitude values which is an average of the peak and trough amplitudes.

In FIGS. 9A1 to 9F1 signal characteristics of the image-defining elements in the form of signal amplitude on the $128^{th}$ column (in the y-direction) are depicted. The $128^{th}$ column is about midway of the number of columns and is selected in convenience.

Referring to FIG. 9A, the signal amplitudes of the image-defining elements in the y-direction comprise an initial portion which starts from y=0 and an oscillatory portion which follows or is after the initial portion. The signal amplitude of the image-defining elements in the initial portion is approximately constant, and is at about zero amplitude. The signal amplitude of the image-defining elements in the oscillatory portion, which is adjacent the steady-state-portion and further away from the origin (0,0), collectively forms a half-oscillation cycle. The value of v=1 defines an image pattern having a half oscillation cycle per-unit of image dimension, which in this example is 1 cm.

For the image pattern of FIGS. 9B to 9F, the v values progressively increment from v=2 to v=6. The number of half oscillation cycles of the signal amplitudes of the image-defining elements in the y-direction progressively changes from 2 to 6 respectively. The steady state portion has an amplitude values which is an average of the peak and trough amplitudes.

In FIGS. 9A2 to 9A10, signal characteristics of the image-defining elements in the form of signal amplitude on the $128^{th}$ column (in the y-direction) are depicted. The data-bearing image pattern of FIGS. 9A2 to 9A10 embedded the same data (60, 1) as that of FIG. 9A1, but with the order value progressively increments form k=20 to k=100. The corresponding blank portion lengths of FIGS. 9A1 to 9A10 are set out in Table below.

TABLE C

| 9A1 | 9A2 | 9A3 | 9A4 | 9A5 | 9A6 | 9A7 | 9A8 | 9A9 | 9A10 |
|---|---|---|---|---|---|---|---|---|---|
| 10 | 20 | 30 | 40 | 50 | 60 | 70 | 80 | 90 | 100 |
| 75 | 118 | 141 | 155 | 165 | 173 | 179 | 183 | 187 | 190 |

It is noted that as the value of u increases, the length of the blank regions in the x-direction of the corresponding spatial pattern decreases; and as the value of v increases, the length of the blank regions along they-direction of the corresponding spatial pattern decreases. The blank region is a region there is no image signal level oscillation between a high level and a low level or vice versa. The blank region may be at a high signal level region or a low signal level region and is a region between the image plane origin and the region where oscillation begins.

The example data-bearing image pattern of FIG. 10A is formed by linear superimposition of a data-bearing image pattern of the Bessel data $β_1$ (1,64) and a data-bearing image pattern of the Bessel data $β_2$(60,1), with origin and axes aligned. The example data-bearing image pattern of FIG. 10B is formed by linear superimposition of a data-bearing image pattern of the Bessel data $β_1$(60,10) and a data-bearing image pattern of the Bessel data $β_2$(10,64), with origin and axes aligned. The image signal properties of the resultant Bessel data embedded image pattern are a direct linear superimposition of the properties $\hat{I}(x,y)$ of the component Bessel data embedded image patterns without loss of generality. The example data-bearing image pattern of FIGS. 11A and 11A1 comprises a plurality of embedded Fourier data $F_i$ in a Fourier data plane as depicted in FIG. 11C1 and a plurality of embedded Bessel data $\beta_i$ in a Bessel data plane as depicted in FIG. 11C2. The Fourier data plane and the Bessel data plane have identical dimensions, are axes (i.e., axes) and origins aligned, and are coterminous. The coordinates of the Fourier data and Bessel data of the example image pattern are set out in Table D below. The example data-bearing image pattern comprises linear superimposition of a Fourier data-bearing image pattern $\hat{I}_{FFT}(x,y)$ which is due to the Fourier data $F_i$ and a Bessel data-bearing image pattern $\hat{I}_{Bessel}(x,y)$ which is due to the Bessel data $\beta_i$.

TABLE D

| Data Point (i) | Data Point in Fourier Domain ($F_i$) | | Data Point in Bessel Domain ($\beta_i$) | |
| --- | --- | --- | --- | --- |
| | u | v | u | v |
| 1 | 110 | 449 | 61 | 16 |
| 2 | 63 | 403 | 55 | 31 |
| 3 | 0 | 385 | 45 | 45 |
| 4 | 448 | 402 | 32 | 55 |
| 5 | 402 | 449 | 16 | 61 |

The example data-bearing image pattern of FIG. 11B is a quantized version, and more specifically binary level quantized version, of the data-bearing image pattern of FIG. 11A. To form the data-bearing image pattern of FIG. 11, an image pattern formed by Fourier transformation of the Fourier data and an image pattern formed by Bessel transformation of the Bessel data are superimposed linearly. To recover the embedded data information, reverse Bessel transform is used to operate on the spatial signal information contained in the image-defining elements to recover the embedded Bessel data information and reverse Fourier transform is used to operate on the spatial signal information contained in the image-defining elements to recover the embedded Bessel data information.

To devise an authentication device, a transformation process, a set of data, an image size, and pixel numbers are determined or selected. The set of data may comprise one discrete data or a plurality of data of the present disclosure. The transformation process may comprise a transformation function or transformations of the present disclosure. The order(s) of the transformation function as a coding key and a decoding key is(are) selected. The transformation process may comprise an additional transformation function or transformation functions such as Fourier or other periodical oscillatory functions. After the transformation process and parameters have been selected, a computer-based machine, for example, a microprocessor-based computer is to perform the transformation process on the discrete data using the transformation function(s) and the selected parameters to generate a data-bearing image pattern as a security feature. The parameters include the selected order or orders, the set of discrete data, the image matrix size and the pixel numbers.

For example, the data-bearing image pattern of FIG. 10A is a result of transformation on the data $\beta_1$ and $\beta_2$ with the parameters that the image size=1 cm×1 cm, a pixel matrix of N=M=256, and Bessel function order of 10.

For example, the data-bearing image pattern of FIG. 10A is a result of transformation on the data $\beta_1$ and $\beta_2$ with the parameters that the image size=1 cm×1 cm, a pixel matrix of N=M=256, and Bessel function order of 10.

After a set of discrete data has been selected, the data may be tabulated or posted on a data plane according to the coordinates of the selected data. A data location on the data plane may be assigned a nominal value, for example, a value of "1" to indicate presence of a data on the data plane location and a value of "0" to indicate non-presence or non-data on the data plane location. For example, the location having location coordinates $u_i,v_i$ of $D_i$ is given a value of 1, while locations not tabulated with a data is assigned the value 0. A binary value is used for convenience, but other value systems to represent assigned signal amplitude $A_i$ may be used.

In the data plane representation of FIGS. 11C1 and 11C2, a black dot on a plain or white background indicates presence of a selected data at that location. In some embodiments, presence of a data may be indicated by a white dot on a black or dark background without loss of generality.

An example apparatus suitable for performing verification of authentication is depicted in FIG. 12A. The apparatus comprises a microprocessor, a data storage device including RAM and ROM, an image capture device and a display. The apparatus may comprise a light source and a communication frontend such as a wireless telecommunications frontend as options. A smartphone installed with an application software embedding the transformation process is an example authentication apparatus of the present disclosure.

To perform authentication operations, a user is to aim the image capture device of the apparatus at the data-bearing image pattern and to aligned the image pattern with the marks of the alignment device. After alignment has completed, as depicted in FIG. 12B, a user is to operate the apparatus to capture an image of the aligned data-bearing image pattern and to stored the signal characteristics of the data-bearing image pattern. When storing the data-bearing image, the signal characteristics and the related spatial information, that is, spatial coordinates of the image-defining elements are also stored. The processor, for example, the built-in microprocessor, of the apparatus is to perform inverse transformation on the data-bearing image pattern to recover the embedded data. To perform inverse transformation, the apparatus is to process the stored signal characteristics of the image-defining elements with reference to the spatial coordinates and then to compute the signal magnitude $S_i$ at a data plane location having the data plane coordinates $u_i,v_i$ of the selected data $D_i$, for example, using the computational relationship of E180. The computed signal magnitude $S_i$ is then compared with an expected signal magnitude $\Phi_i$ computed from the computational relationships E160 and E180. If the signal magnitude $S_i$ obtained from processing a copy of the image pattern is within an acceptable range, for example, after taking into loss or degradation of image fidelity or quality due to the capture process, a positive outcome is given to confirm or verify authenticity. On the other hand, if the signal magnitude $S_i$ obtained from processing a copy of the image pattern is outside an acceptable range, for example, after taking into loss or degradation of image fidelity or quality due to the capture process, a negative outcome is given to deny verification of authenticity.

While Bessel function of the first kind is used in the examples as it has an effect of spreading the data coordinates of a discrete data into a set of distributed image elements such as a set of continuously distributed image elements as depicted in FIGS. 1A to 2B. Another advantage of the Bessel function is its key dependence, so that the amplitude intensity distribution is variable and dependent on a key k. Without prior knowledge of the key and the specific transformation function, which in this example is the order of the Bessel function, retrieval of the data u, v is virtually impossible.

While Bessel function of the first kind has been used as example above, it would be appreciated that other functions that can spread a discrete data point into a set of distributed image elements and the characteristics of the set of distributed image elements can be further carried by a preselected key would also be suitable. Hankel function and Riccati-Bessel function etc. are other suitable examples to form transformation functions.

While the term 'spread' has been used in this disclosure since the effect of the transformation is akin to the function of a 'point spreading function', such a term has been used in a non-limiting manner to mean that a discrete data is transformed into a set of distributed image elements. In general, a suitable transformation function would be one that could operate to represent a discrete data symbol such as data symbols $(u_i, v_i)$ above with information or coding spread in the spatial domain. While spreading functions having aperiodic properties in their spatial domain distribution or spread have been described above, it would be understood by persons skilled in the art that functions having periodic properties in their spatial domain distribution or spread that are operable with a key for coding would also be used without loss of generality.

The invention claimed is:

1. A method of forming a security feature on an information bearing device by a machine executing stored instructions to perform a transformation process, wherein the method comprises:
  selecting a set of discrete data, wherein the discrete data is a two-dimensional data comprising a first data coordinate and a second data coordinate, wherein the first data coordinate is a coordinate in a first axial direction defined by a first coordinate axis of a data plane and the second data coordinate is a coordinate in a second axial direction defined by a second coordinate axis of the data plane, the second coordinate axis being orthogonal to the first coordinate axis;
  machine transforming the set of discrete data into a data-bearing image pattern using a transformation function, wherein the data-bearing image pattern is defined by signal characteristics of a plurality of image-defining elements, wherein the transformation function is an oscillatory function which is to transform the discrete data into a scrambled image pattern in which the signal characteristics of the image-defining elements are oscillatory between peaks and troughs, and wherein oscillation signal characteristics of the image-defining elements are dependent on the first data coordinate, the second data coordinate, and order of the transformation function; and
  wherein the first data coordinate, the second data coordinate, and the order are integrated into the signal characteristics of the image-defining elements of the data-bearing image pattern and are recoverable by an inverse transformation process.

2. The method of claim 1, wherein the first data coordinate, the second data coordinate, and the order are not decodable by human beings through human senses from the data-bearing image pattern.

3. The method of claim 1, wherein the oscillatory characteristics comprise decaying oscillatory amplitudes and decay of the oscillatory amplitudes is determined by the function order.

4. The method of claim 1, wherein the transformation function is a Bessel function including a spherical Bessel function or a modified Bessel function, or a Hankel function including a spherical Hankel function.

5. The method of claim 1, wherein the transformation process is such that the first data coordinate, the second data coordinate, and the order are integrated into each and every image-defining element.

6. The method of claim 1, wherein the transformation function comprises a first elementary function and a second elementary function, wherein each one of the elementary function is a decaying oscillatory function, wherein the first elementary function is to operate on the first data coordinate to generate a first product defining signal characteristics of the image-defining elements in a first image direction, and the second elementary function is to operate on the second data coordinate to generate a second product defining signal characteristics of the image-defining elements in a second image direction orthogonal to the first image direction, and wherein the first product and the second product are multiplied to define signal characteristics of the data-bearing image pattern.

7. An information bearing device comprising a data-bearing image pattern, wherein the data-bearing image pattern is covertly embedded with a set of discrete data to form a set of security features, wherein the discrete data is embedded into the image pattern by a data transformation process, wherein the set of discrete data comprises one discrete data or a plurality of discrete data, wherein the discrete data is a two-dimensional data comprising a first data coordinate and a second data coordinate, wherein the first data coordinate is a coordinate in a first axial direction defined by a first coordinate axis of a data plane and the second data coordinate is a coordinate in a second axial direction defined by a second coordinate axis of the data plane, the second coordinate axis being orthogonal to the first coordinate axis; wherein the data transformation process comprises a computational process which transforms the discrete data into spatial distribution of a plurality of image-defining elements by a transformation function, wherein the transformation function is an oscillatory function having oscillatory characteristics which are dependent on the first data coordinate, the second data coordinate and an order k, where the order k is a natural number or half-odd-natural number; wherein the oscillatory characteristics include oscillation amplitude, and wherein the image-defining elements are distributed such that signal values of the image-defining elements are dependent on the oscillatory characteristics of the transformation function.

8. The information bearing device of claim 7, wherein the discrete data is not decodable by human beings through human sense from the data-bearing image pattern.

9. The information bearing device of claim 7, wherein the oscillatory characteristics comprise decaying oscillatory amplitudes and decay of the oscillatory amplitudes is determined by the function order.

10. The information bearing device of claim 7, wherein the transformation function is a Bessel function including a spherical Bessel function or a modified Bessel function, or a Hankel function including a spherical Hankel function.

11. The information bearing device of claim 7, wherein the image-defining elements are distributed in an image plane, the image plane comprising a first image plane axis and a second image plane axis which is orthogonal to the first image plane axis, and wherein each image-defining element carries an image value which embeds values of the first data coordinate and the second data coordinate as transformed by the transformation function.

12. The information bearing device of claim 7, wherein the transformation process includes embedding values of the first data coordinate and value of the second ordinate into the plurality of image-defining elements, and the plurality of image-defining elements are scattered or spread to form the data-bearing image pattern.

13. The information bearing device of claim 7, wherein the image-defining elements are distributed in an image plane comprising a first image plane axis and a second image plane axis which is orthogonal to the first image plane axis, wherein an image-defining element at an image plane coordinate on the image plane defined by the first image plane axis and the second image plane axis in cooperation has a signal value which is determined by value of the first data coordinate, value of the second data coordinate and k, where k is an integer or half-odd-integer.

14. An authentication apparatus comprising a data processor, a data storage device, an image capture apparatus, an image display device, a telecommunications frontend and a set of stored instructions for processing a data-bearing image pattern of an authentication device,
   wherein the data-image bearing pattern comprises a plurality of image-defining elements and each image-defining element has an associated signal characteristic, wherein the data-image bearing pattern is embedded with a set of discrete data and each discrete data comprises a first data coordinate and a second data coordinate, and wherein the set of discrete data is embedded in the data-bearing image pattern by a transformation process, the transformation process comprises a transformation function having oscillation amplitude characteristics and a characteristics order k as a coding key, k being a natural number or a half odd natural number; wherein the first data coordinate, the second data coordinate and the order are embedded in the plurality of image-defining elements;
   wherein the data processor is to execute the stored instructions:
      to perform inverse transformation on the image-defining elements of the data-bearing image pattern using spatial coordinates of the image-defining elements, the order k and an inverse of the transformation function to obtain a computed data signal magnitude at a data location having the first data coordinate and the second data coordinate,
      to compare the computed data signal magnitude with an expected data signal magnitude obtained by processing the first data coordinate, the second data coordinate, the order k and the transformation process; and
      to confirm authentication if outcome of comparison is positive and to deny verification if outcome of comparison is negative.

15. The apparatus of claim 14, wherein the set of discrete data comprises a plurality of discrete data each comprising a first data coordinate and a second data coordinate, where the plurality of discrete data comprises a first discrete data having a first image pattern obtained by transformation of the first discrete data by the transformation process and a second discrete data having a second image pattern obtained by transformation of the first discrete data by the transformation process, the second image pattern being different to the first image pattern; wherein the first and second image pattern are overlapped with alignment in axes and origin to form the data-bearing image pattern.

16. The apparatus of claim 14, wherein the data processor is to execute the stored instructions:
   to generate an alignment device on the image display device, the alignment device defining an area corresponding to an image size and a number of image-defining elements,
   to guide a user to capture an image of the data-bearing image pattern using the alignment device, and
   to capture the image when the image and the alignment device are aligned.

17. The apparatus of claim 14, wherein the data processor is to execute the stored instructions to process the image-defining elements using an inverse of the transformation function, wherein the transformation function is to generate a data-bearing image pattern having decaying oscillatory amplitude properties, and the oscillatory amplitude properties are dependent on the first data coordinate, the second data coordinate and the order k.

18. The apparatus of claim 14, wherein the data processor is to execute the stored instructions to process the image-defining elements using an inverse of the transformation function, wherein the transformation function is to generate a data-bearing image pattern in which the embedded data is not decodable by human beings through human senses from the data-bearing image pattern.

* * * * *